United States Patent
Gahlot et al.

(10) Patent No.: US 10,432,713 B2
(45) Date of Patent: *Oct. 1, 2019

(54) APPLICATION AWARE INPUT/OUTPUT FENCING

(71) Applicant: Veritas Technologies LLC, Mountain View, CA (US)

(72) Inventors: Jai Gahlot, Pune (IN); Abhijit Toley, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/252,452

(22) Filed: Aug. 31, 2016

(65) Prior Publication Data

US 2018/0004612 A1 Jan. 4, 2018

(30) Foreign Application Priority Data

Jun. 30, 2016 (IN) .............................. 201621022438

(51) Int. Cl.
| | |
|---|---|
| *G06F 11/00* | (2006.01) |
| *H04L 29/08* | (2006.01) |
| *H04L 12/24* | (2006.01) |
| *G06F 16/25* | (2019.01) |
| *G06F 11/20* | (2006.01) |

(52) U.S. Cl.
CPC ...... *H04L 67/1034* (2013.01); *G06F 11/2005* (2013.01); *G06F 11/2028* (2013.01); *G06F 16/254* (2019.01); *H04L 41/082* (2013.01); *H04L 67/1097* (2013.01); *H04L 41/0668* (2013.01); *H04L 41/0859* (2013.01)

(58) Field of Classification Search
CPC ............. G06F 11/2028; G06F 11/2005; G06F 17/30563; G06F 16/254; H04L 67/1034; H04L 64/1097; H04L 41/082; H04L 41/0859; H04L 41/0668
See application file for complete search history.

(56) References Cited

U.S. PATENT DOCUMENTS

| 7,069,270 | B1 | 6/2006 | Kumar |
| 7,203,700 | B1 * | 4/2007 | Kumar ................. G06F 9/4868 |
| 7,631,066 | B1 | 12/2009 | Schatz et al. |
| 8,024,432 | B1 | 9/2011 | Sharma et al. |
| 9,124,534 | B1 | 9/2015 | Bhalerao et al. |
| 9,146,790 | B1 * | 9/2015 | Dash ....................... G06F 11/00 |
| 2002/0007468 | A1 | 1/2002 | Kampe et al. |

(Continued)

OTHER PUBLICATIONS

Herr, Anthony; "Symantec Cluster Server 6.2 I/O Fencing Deployment Considerations," 2014, Veritas, www.vox.veritas.com/qsuop67736/attachments/qsuop67736/Articles-Business-Continuity/159/1/10%20Fencing%20whitepaper-6.2-2014-final.pdf.

*Primary Examiner* — Jason B Bryan
(74) *Attorney, Agent, or Firm* — Campbell Stephenson LLP

(57) ABSTRACT

Disclosed herein are methods, systems, and processes to perform application aware input/output (I/O) fencing operations. Performing such an application aware I/O fencing operation includes installing an identifier that identifies an instance of an application with a node on which the instance of the application is executing, on coordination points. A weight assigned to the instance of the application is determined, and the instance of the application is terminated based on the weight.

22 Claims, 18 Drawing Sheets

(56) References Cited

U.S. PATENT DOCUMENTS

| | | |
|---|---|---|
| 2002/0049845 A1 | 4/2002 | Sreenivasan et al. |
| 2006/0048108 A1* | 3/2006 | Ushiku .................. G06F 9/445 717/136 |
| 2010/0306573 A1* | 12/2010 | Gupta ................. G06F 11/1425 714/4.1 |
| 2011/0145635 A1* | 6/2011 | Buckler .............. G06F 11/0715 714/15 |
| 2012/0144457 A1 | 6/2012 | Counterman |
| 2013/0139219 A1* | 5/2013 | Cai ........................ H04L 63/10 726/3 |
| 2017/0094003 A1 | 3/2017 | Gahlot et al. |

* cited by examiner

300 ↘

| Application Weight Matrix (AWM) 160 | | | | | |
|---|---|---|---|---|---|
| Application Field 310 | Node 125(1) | Node 125(2) | Node 125(3) | Node 125(4) | Total Application Weight Field 320 |
| Application 140 | 2 | 2 | 0 | 0 | 4 |
| Application 145 | 0 | 4 | 4 | 0 | 8 |
| Application 150 | 0 | 0 | 6 | 6 | 12 |
| Application 155 | 8 | 8 | 0 | 8 | 24 |
| Total Node Weight Field 330 | 10 | 14 | 10 | 14 | 48 |

| Coordination Point Registration Key Matrix (CPRKM) 410 | | | | |
|---|---|---|---|---|
| Application Field 420 | Node 125(1) | Node 125(2) | Node 125(3) | Node 125(4) |
| Application 140 | 125(1)-140 | 125(2)-140 | - | - |
| Application 145 | - | 125(2)-145 | 125(3)-145 | - |
| Application 150 | - | - | 125(3)-150 | 125(4)-150 |
| Application 155 | 125(1)-155 | 125(2)-155 | - | 125(4)-155 |

FIG. 4

APPLICATION AWARE INPUT/OUTPUT FENCING

CROSS-REFERENCE TO RELATED APPLICATIONS

This application claims benefit under 35 U.S.C. § 119(a) of pending Indian Patent Application No. 201621022438, filed in India on Jun. 30, 2016, entitled "Application Aware Input/Output Fencing," and having Jai Gahlot and Abhijit Toley as inventors. The above-referenced application is incorporated by reference herein, in its entirety and for all purposes.

FIELD OF THE DISCLOSURE

This disclosure relates to distributed storage in computing clusters. In particular, this disclosure relates to performing application-aware fencing operations in such clusters.

DESCRIPTION OF THE RELATED ART

Modern companies and organizations provide a variety of online services for their employees, customers, and users. Providing such services requires a variety of software applications (e.g., a database management system (DBMS), and the like). For example, a business may implement a database with pertinent information necessary for an e-commerce transaction where Extract, Transform, and Load (ETL) processes are used to extract data from the database, transform the data for storing (e.g., for querying, analysis, and the like), and load the data for utilization (e.g., into a data store, a data warehouse, and the like).

Various applications can be used to perform individual tasks of ETL processes. For example, an extract application can extract data from the database, a transform application can change the format of the extracted data, and a load application can load the transformed data into a data store. These different applications can be configured to run on multiple nodes (or computing devices) that are part of a cluster.

A cluster is a distributed computing system with several nodes that work together to provide processing power and storage resources by spreading processing load over more than one node, thereby eliminating or at least minimizing single points of failure. Therefore, different applications running on multiple nodes can continue to function despite a problem with one node (or computing device) in the cluster.

"Split-brain" refers to a condition (or situation) where the availability of data (e.g., from shared storage) is inconsistent due to maintenance of separate data sets that overlap in scope. For example, such overlap can potentially occur because of a network partition where sub-clusters are unable to communicate with each other to synchronize their respective data sets. The data sets of each sub-cluster (or network partition) may randomly serve clients by their own idiosyncratic data set updates, without coordination with other data sets from other sub-clusters. Therefore, when a split-brain condition occurs in a cluster, the decision of which sub-cluster should continue to operate (called a partition arbitration process, or simply arbitration) can be made by performing fencing operations using coordination points.

Input/output (I/O) fencing (or simply, fencing) refers to the process of isolating a node of a cluster, and/or protecting shared resources of the cluster when the node malfunctions (or appears to malfunction). Because a cluster has multiple nodes, there is a likelihood that one of the nodes may fail at some point. The failed node may have control over shared resources such as shared storage used and required by the other nodes in the cluster. A cluster must be capable of taking correction action with a node fails, because as noted earlier, data corruption can occur if two nodes in different sub-clusters or network partitions attempt to take control of shared storage in an uncoordinated manner. Therefore, a fencing operation results in the fencing-off (or termination) of one or more nodes in the cluster.

Coordination points can be implemented in a cluster to assist with fencing operations. Coordination points are computing devices that provide a lock mechanism to determine which node (or nodes) are allowed to fence off shared storage (e.g., data drives) from other nodes in the cluster. For example, a node must eject (or uninstall) a registration key of a peer node from a coordination point before that node is allowed to fence the peer node from shared storage.

As previously noted, different applications can be configured to run on multiple nodes that are part of a cluster (e.g., in an ETL workload environment). In such environments, a network partition, as described above, does not necessarily result in a split-brain condition. For example, if all nodes on which a given application is running are in the same network partition, no split-brain condition exists (e.g., there is no risk of uncoordinated access to data).

However, a partitioned cluster can experience a split-brain condition even if there is no node failure (or a risk of node failure). For example, a "application split-brain condition" can be caused by uncoordinated access to data by various instances of an application that are running on separate sub-clusters of a partitioned cluster. For example, if a cluster is partitioned into two separate partitions, two instance of the same application (e.g., instances A and B of an application) running on the two separate partitions can cause a split-brain condition because each instance of the application can attempt to take control of shared storage in an uncoordinated manner, thus giving rise to a risk of data corruption.

If a traditional fencing solution (e.g., as described above) is implemented, the node on which instance A or instance B of the application is running is terminated as part of a fencing operation. Therefore, under a traditional fencing paradigm, nodes in all but one network partition of a cluster are terminated. Unfortunately, such a result compromises the availability of the cluster because a traditional fencing operation results in the termination of healthy nodes in a sub-cluster even if there is no split-brain condition or if there is an application-induced split-brain condition (e.g., as described above). These healthy nodes can be utilized for other computing purposes. Therefore, terminating healthy nodes under such circumstances is redundant, undesirable, and negatively affects cluster availability.

SUMMARY OF THE DISCLOSURE

Disclosed herein are various systems, methods, and processes to perform application-aware input/output (I/O) fencing operations. One such method involves determining that an instance of an application is executing on a node. The node is one of multiple nodes that are part of a cluster. In response to the determination that the instance of the application is executing on the node, the method generates an identifier for the instance of the application that associates the instance of the application and the node on which the instance of the application is executing. The method then installs the identifier on coordination point(s).

In one embodiment, the method determines whether instances of other applications are executing on the node. In response to the determination that instances of other applications are executing on the node, the method generates other identifiers for instances of other applications that associate each of the instances and the node. The method then installs (or registers) the other identifiers on the coordination point(s).

In some embodiments, the identifier is a registration key and the other identifiers are other registration keys. In this example, the method can generate a coordination point registration key matrix that includes multiple registration keys (e.g., the registration key and the other registration keys) that are stored on the coordination point(s). The coordination point registration key matrix is maintained on the coordination point(s).

In other embodiments, the nodes are communicatively coupled to each other, and the coordination point(s) are communicatively coupled to the nodes but are not part of the cluster. The instance of the application and the one or more instances of the other applications are part of multiple application instances. Each application instance of the multiple application instances executes on one or more nodes. The application instances include multiple disparate application instances, including, but not limited to, disparate application instances that can be used to perform multiple Extract, Transform, and Load (ETL) processes.

In certain embodiments, the method receives an application weight matrix that includes a weight assigned to each application, a total application weight, and a total node weight. In this example, the application weight matrix is transmitted to each node that is communicatively coupled to the node.

In one embodiment, the method determines whether the cluster is partitioned into network partitions, and determines whether a split-brain condition exists in the cluster as a result of the partitioning. In this example, the split-brain condition is caused by one or more application instances executing on one or more nodes in the cluster. The method performs an application fencing operation to rectify the (application) split-brain condition by accessing the application weight matrix, and performing a partition arbitration process. In some embodiments, as part of performing the application fencing operation, the method uninstalls (or ejects) registration key(s) of application instance(s) from coordination point(s) based on a result of the partition arbitration process. The uninstalling causes the termination of application instance(s) instead of node(s) on which the application instance(s) are executing.

In some embodiments, the method performs an application fencing operation by installing an identifier on one or more coordination points. In this example, the identifier associates an instance of the application with a node on which the instance of the application is executing. The method then determines a weight assigned to the instance of the application, and terminates the instance of the application based, at least in part, on the weight.

In other embodiments, as part of performing the application fencing operation, the method causes termination of the instance of the application instead of the node on which the instance of the application is executing. The method accesses an application weight matrix that includes the weight assigned to the instance of the application. The method receives the application weight matrix, generates the identifier for the instance of the application (e.g., a registration key), and as part of the installing of the identifier, stores the registration key on one or more coordination points. In this example, the coordination points include one or more coordinator disks or one or more coordination points servers.

In certain embodiments, the method determines whether a cluster is partitioned into network partitions, accesses the application weight matrix, and performs a partition arbitration process using the application weight matrix. The partition arbitration process includes a fencing race to determine a winner partition and one (or more) loser partitions. In this example, the method excludes the instance of the application and other instances of the application from the fencing race, if both the instance of the application and other instances of the application execute on nodes that are part of a same network partition. Conversely, the method includes the instance of the application and other instances of the application in the fencing race, if the application and other instances of the application execute on separate network partitions.

In some embodiments, the fencing race to determine the winner partition and loser partition(s) is decided based on information in the application weight matrix. In this example, and as part of performing the fencing race, the method uninstalls or ejects the registration key for the instance of the application from a coordination point based on the weight assigned to the instance of the application.

In one embodiment, the method determines that a cluster has been partitioned. In this example the cluster includes multiple nodes, and as a result of the partitioning, the nodes are split between a first network partition that includes a first set of nodes and a second network partition that includes a second set of nodes. The method determines that instances of an application are executing on the first set of nodes and the second set of nodes. The method then performs an application fencing operation that causes termination of instances of the application executing on the first set of nodes or on the second set of nodes.

In some embodiments, the method performs a fencing race by accessing an application weight matrix that includes a weight assigned to the application. The method then compares a first total application weight of the first set of nodes and a second total application weight of the second set of nodes. The method bypasses the fencing race, if all instances of the application are executing on the first set of nodes in the first network partition or on the second set of nodes in the second network partition, and broadcasts a message to one or more nodes on which one or more remaining instances of the application are executing.

In other embodiments, the method determines whether the first total application weight of instances of the application executing on the first set of nodes in the first network partition is greater than the second total application weight of instances of the application executing on the second set of nodes in the second partition.

In certain embodiments, performing the fencing race further includes uninstalling a registration key associated with each instance of the application executing on the second set of nodes in the second partition from one or more coordination points. The method determines whether the first total application weight of instances of the application executing on the first set of nodes in the first network partition is lesser than the second total application weight of instances of the application executing on the second set of nodes in the second partition, and based on the determining, performs the fencing race after a delay. In this example, the delay is based on a time required for a second racer node that is part of the second set of nodes to perform another fencing race.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a table illustrating an application weight matrix, according to one embodiment of the present disclosure.

FIG. 4 is a table illustrating a coordination point registration key matrix, according to one embodiment of the present disclosure.

Figure 1A:
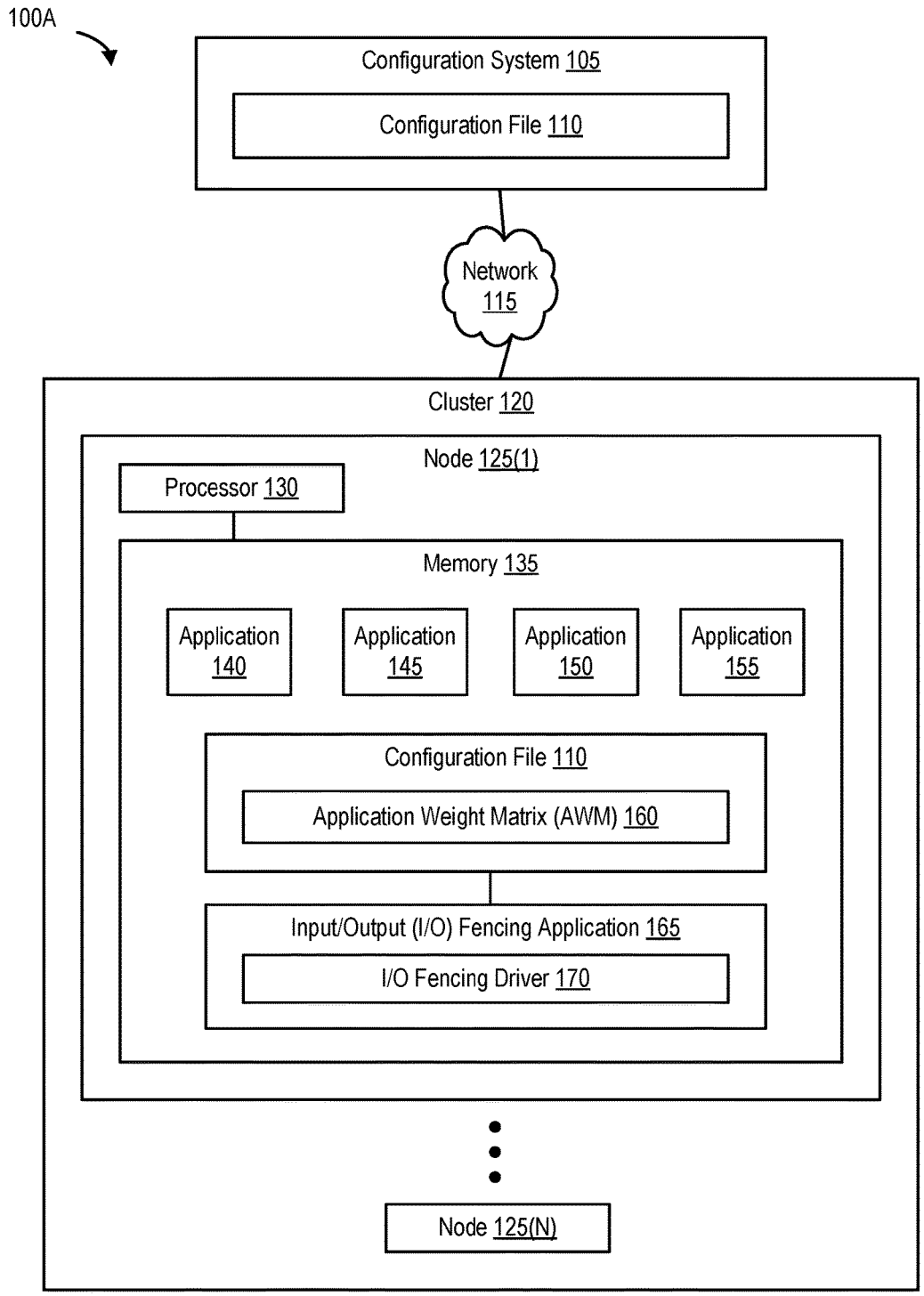
FIG. 1A is a block diagram of a computing system that can perform application fencing operations, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Because modern businesses, companies, and/or organizations increasingly rely on complex computer systems (e.g., distributed storage and/or computing systems) for their daily operations, managing the vast amount of data generated and processed by applications executing on such computer systems is a significant challenge. Various applications are typically used to manage large quantities of data stored on different types of storage devices across various networks and operating system platforms. To efficiently manage data in distributed storage and/or computing systems, Storage Area Networks (SANs) including many different types of storage devices can be implemented. SANs provide a variety of topologies and capabilities for interconnecting storage devices, subsystems, and server systems. For example, a variety of interconnect entities, such as switches, hubs, and bridges, can be used to interconnect these components.

As previously noted, a cluster includes multiple interconnected computers that appear as one computer to end users and applications. Each interconnected computer in the cluster is called a node. The combined processing power of multiple nodes can provide greater throughput and scalability than is available from a single node. In high-availability clusters, multiple nodes can execute instances of the same application and/or instances of different applications. These nodes can share a storage device for the purpose of data storage, replication and/or deduplication. A shared storage disk/device (e.g., a Cluster Shared Volume (CSV)) can be made accessible for read and write operations by various nodes and applications within a cluster. Each cluster can have multiple CSVs. In Flexible Shared Storage (FSS) systems, multiple nodes in a cluster share one or more CSVs. Thus, FSS systems enable cluster-wide network sharing of local storage (e.g., in the form of Direct Attached Storage (DAS), internal disk drives, and the like). Also as previously noted, the network sharing of storage can be enabled through the use of a network interconnect among the nodes of the cluster. This feature allows network shared storage to co-exist with physically shared storage. Therefore, distributed storage systems can be implemented in a multi-node cluster to provide to high-availability of data from one or more storage devices.

One known problem in clusters occurs when one or more nodes of the cluster erroneously believes that other node(s)

are either not functioning properly or have left the cluster. This "split-brain" condition results in the effective partitioning of the cluster into two or more sub-clusters (also called "network partitions"). Causes of a split-brain condition include, among other reasons, failure of the communication channels between nodes, and the processing load on one node causing an excessive delay in the normal sequence of communication among nodes (e.g., one node fails to transmit its heartbeat signal for an excessive period of time).

In addition, and as noted above, a partitioned cluster can experience an "application split-brain" condition that can be caused by uncoordinated access to data by various instances of an application that are executing on separate sub-clusters of the partitioned cluster. For example, if a cluster is partitioned into two separate network partitions, two instance of the same application (e.g., instances A and B of an application) running on the two separate network partitions can cause an application-induced split-brain condition because each instance of the application can attempt to take control of shared storage in an uncoordinated manner, thus giving rise to a risk of data corruption.

For example, if a cluster is configured for a failover operation with an application instance executing on a first node, and another instance of the application executing on a second node existing in the cluster is to takeover for the first node should it fail, then complete failure of a network would lead the second node to conclude that the first node has failed. The another instance of the application executing on the second node then begins operations even though the first node has not in fact failed.

Thus, the potential exists for the instance of the application executing on the first node and the other instance of the application executing on the second node to attempt to write data to the same portion (or area) of one of the storage devices in the distributed storage system thereby causing data corruption. The traditional solution is to ensure that one of the nodes cannot access the shared storage, and as noted above, input/output fencing (or more simply, just fencing) can be implemented to "fence off" the node from the shared storage.

In the event that communication between the nodes fails, such as when a portion of the network fails during a network partition, each of two or more sub-clusters of nodes can determine that the other sub-cluster of nodes has failed (or might have failed). For example, a race (also called a "fencing race") can occur between the two (or more) sub-clusters of nodes, with control modules of each sub-cluster of nodes determining that the other sub-cluster of nodes is malfunctioning. As previously noted, an instance of an application executing on node(s) in a first sub-cluster (or network partition) can perform data writes to the storage device(s), while another instance of the application executing on node(s) in the other sub-cluster (or other network partition) can also perform data writes to the same portion(s) of the shared storage devices, resulting in data inconsistency errors. In order to prevent these data inconsistency errors, an "arbitration process" is performed that determines winner and loser sub-clusters (or groups).

Nodes in the winner sub-cluster are determined to keep communicating with the shared storage, whereas nodes in the loser sub-cluster are determined to stop communicating with these shared storage devices. However, nodes in the winner sub-cluster do not determine if or when nodes in the loser sub-cluster(s) will conclude that they have lost arbitration (and thus desist from using the shared storage devices). Thus, in addition to this arbitration process, the control module of the winner sub-cluster of node(s) can perform a fencing process that fences nodes from the loser sub-cluster(s) from the rest of the distributed storage system. The fencing process is performed to ensure that nodes from the loser sub-cluster(s) do not communicate with the storage devices, as improper data writes from the loser nodes would cause various data inconsistency and other errors.

Generally, fencing can be performed in two stages. In the first stage, fencing attempts to fence out the loser sub-cluster(s) of nodes. The loser nodes can be notified about the outcome of the arbitration and/or about the fencing process being implemented. Such notification can include the control module(s) of the loser sub-cluster of nodes discovering that the loser sub-cluster lost the arbitration process, the control module(s) of the loser sub-cluster of nodes encountering communication errors that indicate loss of communication, and/or communication from the loser nodes being disabled, among others.

In the second stage, fencing removes loser nodes' access to the storage devices, such as by instructing the shared storage devices (that are accessible to the winner sub-cluster) to not accept any communication from the loser nodes. In this case, even if the control module(s) of the winner sub-cluster of nodes cannot ensure that loser sub-cluster(s) of nodes are no longer performing data writes to the shared storage devices (such as by executing instance(s) of a shared application), the loser nodes will not be able to access/modify application data being used by winner nodes. In effect, this fencing mechanism prevents a portion of the cluster from accessing the shared storage devices in an uncoordinated manner.

When performing fencing, it is preferable to use separate computing devices that enable access to shared storage by multiple nodes, and simultaneously block access (to shared storage) by other nodes. Using such separate (and independent) computing devices adds resilience to a distributed storage system during fencing operations by providing additional arbitration mechanisms that integrate seamlessly with existing fencing software running on nodes in a cluster. In addition, such separate computing devices act (or function) as intermediary devices that are dedicated to performing (and managing) fencing operations, thus improving the speed and efficiency of the distributed storage system.

Coordination points (CPs) can be implemented in a cluster as the above mentioned separate computing devices to assist with fencing operations. Coordination points provide a lock mechanism to determine which node (or nodes) are allowed to fence off shared storage (e.g., data drives) from other nodes in the cluster. In addition, coordination points are dedicated devices that enable access to shared storage for multiple nodes, and simultaneously block access (to shared storage) for other nodes (in a cluster). In high-availability clusters, servers, disks, interconnects, and/or other hardware and/or software appliances can be implemented (or used) as coordination points (external to the cluster) to ensure data integrity in case of loss of hardware and/or software components in the cluster. Therefore, coordination points are vital in providing data protection and maintaining high availability in a cluster.

If a traditional fencing solution (e.g., as described above) is implemented, the node on which instance A or instance B of the application is running is terminated as part of a fencing operation. Therefore, under a traditional fencing paradigm, nodes in all but one network partition of a cluster are terminated. Unfortunately, such a result compromises the availability of the cluster because a traditional fencing operation results in the termination of healthy nodes in a sub-cluster even if there is no split-brain condition or if there is an application-induced split-brain condition (e.g., as described above). These healthy nodes can be utilized for other computing purposes. Therefore, terminating healthy nodes under such circumstances is redundant, undesirable, and negatively affects cluster availability.

Described herein are methods, systems, and processes to perform application fencing operations by causing the termination of an instance of an application (e.g., if that instance is responsible for an application-induced split-brain condition) instead of terminating the node on which that instance of the application is executing.

An Example Computing System to Perform Application-Aware I/O Fencing

FIG. 1A is a block diagram of a computing system that performs application I/O fencing operations, according to one embodiment. FIG. 1A includes a configuration system 105 and a cluster 120, communicatively coupled to each other via a network 115. Multiple nodes execute in cluster 120 (e.g., nodes 125(1)-(N)). Configuration system 105 and nodes 125(1)-(N) can be any type of computing device including a server, a desktop, a laptop, a tablet, and the like. Configuration system 105 includes a configuration file 110. As noted, cluster 120 implements and executes nodes 125(1)-(N). As shown in FIG. 1A, node 125(1) includes a processor 130 and a memory 135. Memory 135 implements several applications (e.g., applications 140, 145, 150, and 155). Memory 135 also includes configuration file 110, which further includes an application weight matrix (AWM) 160. Memory 135 also implements an input/output (I/O) fencing application 165 (or simply fencing application 165) with an I/O fencing driver 170.

Configuration file 110 is generated by configuration system 105 and can be transmitted to node 125(1) via network 115. Configuration file 110 contains information regarding coordination points as well as AWM 160. For example, configuration 110 can identify the coordination points implemented in the computing system of FIG. 1A (not shown), and can include information regarding the total number of coordination points as well. For example, configuration file 110 can identify a total of three coordination points that are implemented in a distributed computing system. In one embodiment, configuration file 110 can be created by an administrator and/or user of configuration system 105. Once generated by configuration system 105, configuration file 110 with AWM 160 can be transmitted to node 125(1) and can be used by node 125(1) to perform application fencing operations.

Figure 1B:
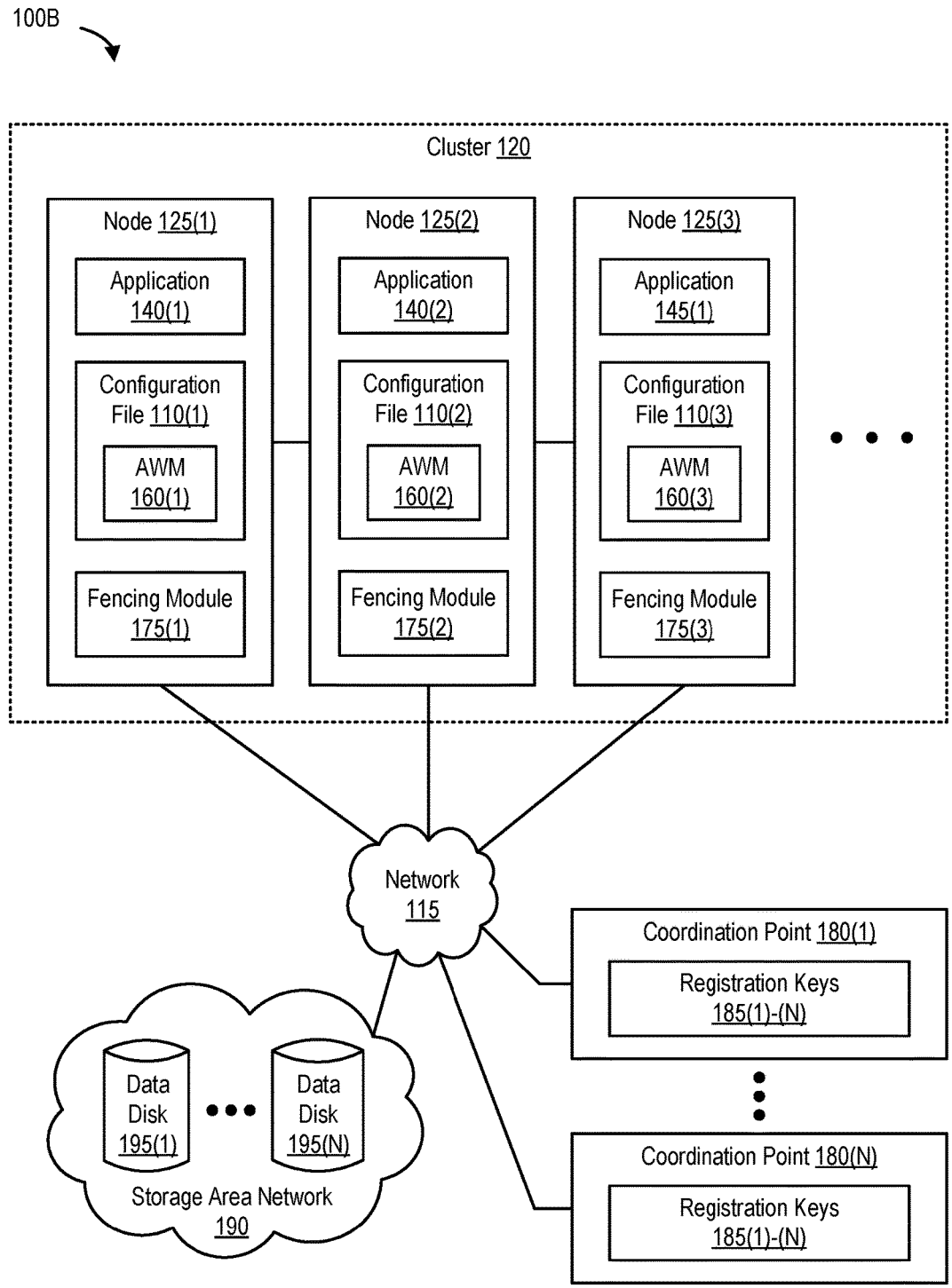
FIG. 1B is a block diagram of a nodes in a cluster that can perform application fencing operations, according to one embodiment of the present disclosure.

FIG. 1B is a block diagram of a distributed computing system that performs application-aware I/O fencing, according to one embodiment. As shown in FIG. 1B, cluster 120 includes nodes 125(1)-(3). Node 125(1) executes application 140(1) and includes configuration file 110(1) with AWM 160(1), and a fencing module 175(1). Similarly, node 125(2) executes application 140(2) (e.g., a second instance of application 140) and includes configuration file 110(1) with AWM 160(2), and fencing module 175(2). However, node 125(3) executes application 145(1) (a different application instance), but like nodes 125(1) and 125(2), includes a configuration file, an AWM, and a fencing module (e.g., configuration file 110(3) with AWM 160(3), and fencing module 175(3)). A fencing module (also called a "fencing control unit") can be implemented on each node (e.g., by configuration system 105). In some embodiments, the fencing module can be a kernel module. Fencing modules 175(1)-(3) (or fencing control units 175(1)-(3)) are responsible for ensuring valid and current cluster membership (or membership change) through membership arbitration (e.g., the arbitration process as described above).

In some embodiments, fencing modules 175(1)-(3) also register nodes 125(1)-(3) as well as instance(s) of application(s) executing on nodes 125(1)-(3) with coordination points (CPs) 180(1)-(N). For example, fencing module 175(1), can place (or install/register) an application-aware registration key identifying node 125(1) and one or more instances of applications executing on node 125(1) on coordination points 180(1)-(N) using AWM 160(1). Similarly, fencing modules 175(2) and 175(3), each place (or install/register) an application-aware registration key identifying nodes 125(2) and 125(3) and instance(s) of application(s) executing on nodes 125(2) and 125(3) on coordination points 180(1)-(N) using AWMs 160(2) and 160(3), respectively. Therefore, registration keys 185(1)-(N) are application-aware registration keys of nodes 125(1)-(3). It will be appreciated that as used herein, the term "registration key" refers to an "application-aware registration key" as described above (e.g., an association between a node and instance(s) of application(s) executing on that node).

As shown, FIG. 1B also includes a storage area network (SAN) 190 which implements data disks 195(1)-(N). SAN 190, coordination points 180(1)-(N) and nodes 125(1)-(3) are communicatively coupled to each other via network 115. It should be noted that configuration files 110(1)-(3) received from configuration system 105 include the same information (e.g., AWMs 160(1), 160(2) and 160(3), respectively).

An Example of a Network Partitioning Event that does not Cause Split-Brain

Figure 2A:
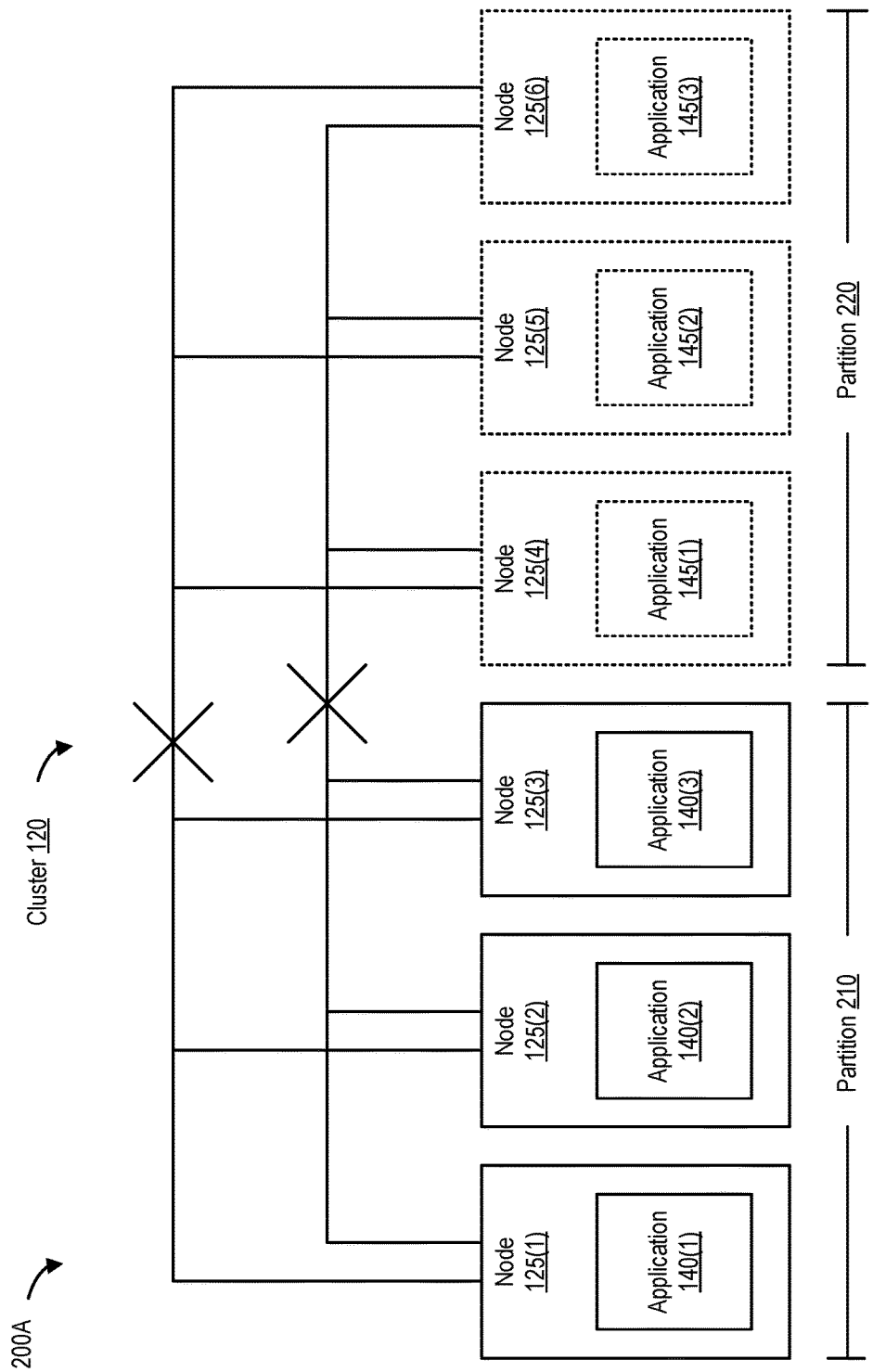
FIG. 2A is a block diagram of a partitioned cluster that does not experience a split-brain condition, according to one embodiment of the present disclosure.

FIG. 2A is a block diagram of a partitioned cluster that does not experience a split-brain condition, according to one embodiment. Cluster 120 is partitioned into two sub-clusters (e.g., partition 210 and partition 220) using different communication channels. Partition 210 includes nodes 125(1)-(3) and partition 220 includes nodes 125(4)-(6). Node 125(1) executes application 140(1), node 125(2) executes application 140(2), and node 125(3) executes application 140(3). Node 125(4) executes application 145(1), node 125(5) executes application 145(2), and node 125(6) executes application 145(3). Applications 140 and 145 are separate and distinct applications, instances of which execute in partitions 210 and 220, respectively.

Therefore, if cluster 120 is partitioned, there is no split-brain condition because partitions 210 and 220 are running (or executing) separate and independent applications (e.g., applications 140 and 145). Performing a traditional fencing operation in this scenario would result in partition 220 being ejected out of cluster 120 and the termination of nodes 125(4)-(6) even though there is no split-brain condition (e.g., there is no risk that different instances of one application will perform I/O operations to data disks 195(1)-(N) upon cluster partition). Therefore, under a tradition fencing paradigm, cluster 120 would lose healthy nodes (e.g., nodes 125(4)-(6)) and would result in an unnecessary and redundant failover of application 145. In this situation, it would be desirable for both partitions 210 and 220 to continue operating as there is no potential data corruption.

Figure 2B:
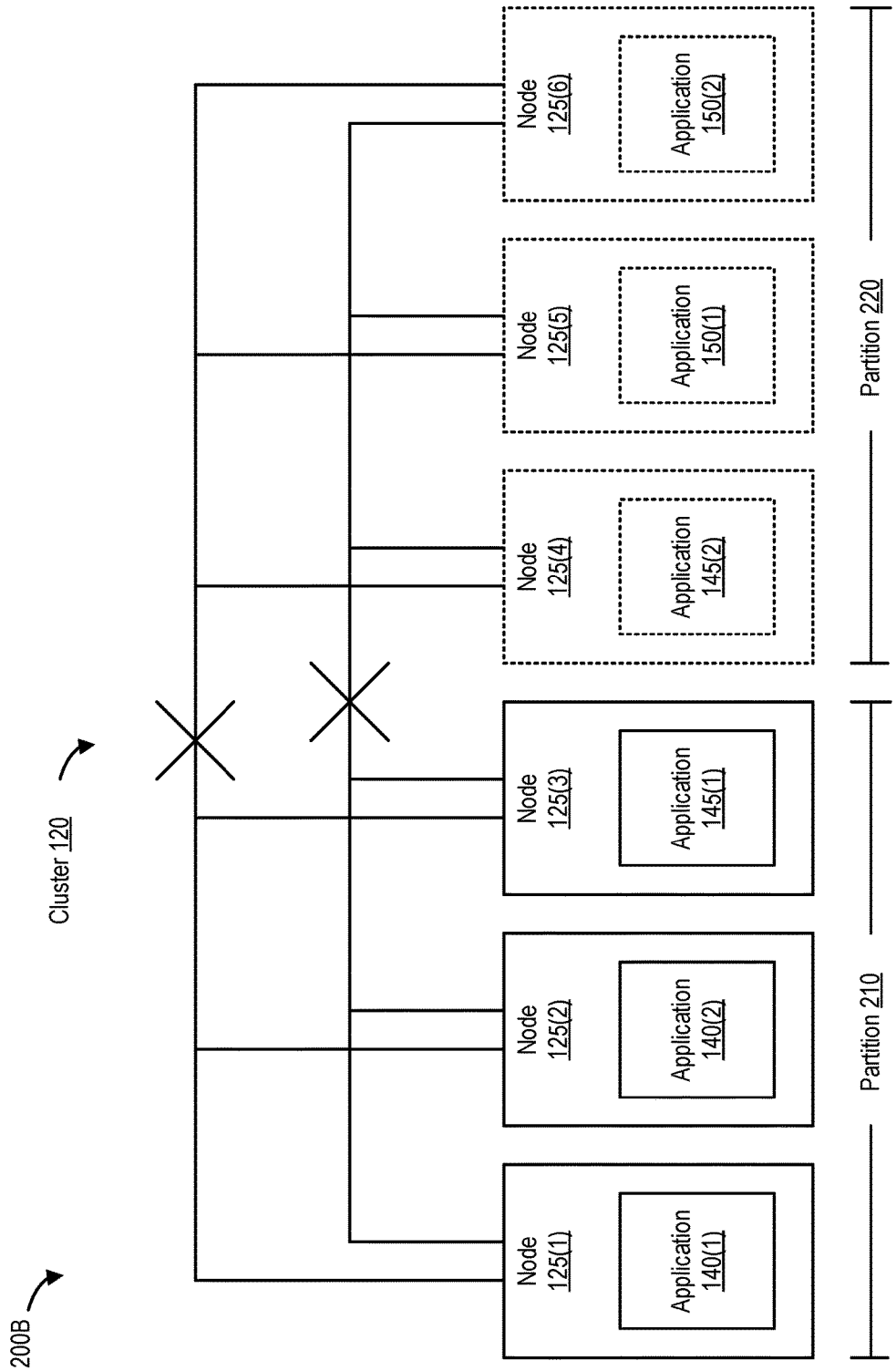
FIG. 2B is a block diagram of a partitioned cluster that experiences an application-induced split-brain condition, according to one embodiment of the present disclosure.

An Example of a Network Partitioning Event that Causes Application-Induced Split-Brain FIG. 2B is a block diagram of a partitioned cluster that experiences an application-induced split-brain condition, according to one embodiment. As shown in FIG. 2B, cluster 120 is partitioned into two sub-clusters (e.g., partitions 210 and 220). Partition 210 includes nodes 125(1)-(3), and partition 220 includes nodes 125(4)-(6). Node 125(1)

executes application 140(1), node 125(2) executes application 140(2), and node 125(3) executes application 145(1). Similarly, node 125(4) executes application 145(2), node 125(5) executes application 150(1), and node 125(6) executes application 150(2). Applications 140, 145, and 150 are separate and distinct applications.

As shown in FIG. 2B, all instances of application 140 (e.g., applications 140(1) and 140(2)) execute entirely in partition 210, and all instances of application 150 (e.g., applications 150(1) and 150(2)) execute entirely in partition 220. Therefore, there is no split-brain condition experienced by cluster 120 as a result of applications 140 and 150. However, different instances of application 145 (e.g., applications 145(1) and 145(2)) execute on separate sub-clusters as a result of cluster partitioning. For example, application 145(1) executes on partition 210 and application 145(2) executes on partition 220. Therefore, in this scenario, cluster 120 experiences an application-induced split-brain condition caused by application 145 because there is a risk of data corruption that can be caused by different instances of application 145 (e.g., applications 145(1) and 145(2)) performing I/O operations at the same time.

Performing a traditional fencing operation under such circumstances would result in the ejection of partition 220 out of cluster 120, termination of nodes 125(4)-(6) (e.g., as shown by dotted lines in FIG. 2B), and an unnecessary and redundant failover of instances of application 150 (e.g., applications 150(1) and 150(2)) when only the failover of application 145 (e.g., application 145(2)) is required to rectify the split-brain condition in cluster 120. In this situation, it would be desirable for nodes 125(5) and 125(6) to continue operating in partition 220 as there is no potential for data corruption to be caused by applications 150(1) and 150(2).

Therefore, and as noted above, performing traditional fencing operations in distributed computing systems that implement multiple instances of disparate applications results in at least two shortcomings. First, a tradition fencing operation results in the termination of healthy nodes in a cluster even if there is no split-brain condition (e.g., as shown in FIG. 2A). Second, a traditional fencing operation results in termination of healthy nodes in a cluster even if instance(s) of application(s) executing on those (healthy) nodes are not responsible for an application-induced split-brain condition (e.g., as shown in FIG. 2B).

An Example of an Application Weight Matrix

FIG. 3 is a block diagram of an application weight matrix (AWM), according to one embodiment. As noted above, an AWM can be generated by a system administrator and can be transmitted to one or more nodes as part of a configuration file. Each node in a cluster can maintain a copy of an AWM (e.g., as shown in FIG. 1B). For example, the AWM can be transmitted to each node in cluster 120 that is communicatively coupled to the node(s) that receives the AWM from configuration system 105.

As shown in FIG. 3, AWM 160 includes a list of all applications (and instances of all such applications) executing in cluster 120. AWM 160 also identifies one or more nodes on which such instances of applications are executing, whether the nodes are failover nodes or parallel nodes, a relative criticality of each application (e.g., in the form of a numerical value assigned to each application called an application weight, or simply weight), as well as any changes to the foregoing information.

AWM 160 as shown in FIG. 3, identifies nodes 125(1)-(4) and a weight of each application that is executing on each of nodes 125(1)-(4). For example, application 140 executes on nodes 125(1) and 125(2) (and has a weight of 2), application 145 executes on nodes 125(2) and 125(3) (and has a weight of 4), application 150 executes on nodes 125(3) and 125(4) (and has a weight of 6), and application 155 executes on nodes 125(1), 125(2), and 125(3) (and has a weight of 8). AWM 160 includes a total application weight field 320 which includes a total application weight of an application executing on one or more nodes in cluster 120. AWM 160 also includes a total node weight field 330 which includes a total node weight of one or more applications executing on a particular node. In some embodiments, information contained in AWM 160 can be used to perform application fencing operations.

An Example of Registering Application-Aware Registration Keys on Coordination Points FIG. 4 is a block diagram of a coordination point registration key matrix (CPRKM), according to one embodiment. It will be appreciated that CPRKM 410 visually illustrates the registration, placement, or installation of specific application-aware registration keys on coordination points. CPRKM 410 may or may not be used in a table format. If CPRKM 410 is used as a matrix or table by fencing modules 175(1)-(N), then CPRKM 410 can be maintained by or stored on coordination points 180(1)-(N). However, CPRKM 410 is not required in addition to the registration keys themselves to perform application I/O fencing operations.

Under a tradition fencing paradigm, only a node is identified and registered in the form of a key (e.g., a key is registered on a coordination point per node, and partition arbitration is performed on the basis of this key). However, in one embodiment, application-aware registration keys are installed, placed, or registered on coordination points by a fencing module. For example, fencing module 175(1) registers, places, or installs a registration key pertaining to each application running or executing on a particular node (e.g., an application-aware registration key). This "application-aware" registration key can be used in some embodiments to perform partition arbitration in the context of specific applications.

Each application-aware registration key contains at least two pieces of information—a node identifier and an application identifier (collectively referred to herein as "identifier"). For example, CPRKM 410 of FIG. 4 contains 9 registration keys 185(1)-(9). Each registration key has a node identifier (e.g., 125(1)) and an application identifier (e.g., 140). Therefore, registration keys 185(1)-(9) (or identifiers) installed on coordination points 180(1)-(N) are 125(1)-140, 125(2)-140, 125(2)-145, 125(3)-145, 125(3)-150, 125(4)-150, 125(1)-155, 125(2)-155, and 125(4)-155, respectively.

In one embodiment, fencing application 165 (which includes a fencing driver and a fencing module) determines that an instance of an application is executing on a node, and generates an identifier for the instance of the application that associates the instance of the application and the node on which the instance of the application is executing (e.g., 125(1)-140). Fencing application 165 then installs the identifier on coordination point(s). In another embodiment, fencing application 165 determines whether instances of other applications are executing on the node. If instances of other applications are executing on the node, fencing application 165 generates other identifiers for instances of other applications that associate each of the instances and the node (e.g., 125(1)-155). Fencing application 165 then installs (or registers) the other identifier(s) on the coordination point(s).

In certain embodiments, the identifier and the other identifier(s) are application-aware registration keys.

In some embodiments, fencing application 165 can determine whether cluster 120 is partitioned into two (or more) network partitions (e.g., partitions 210 and 220). Fencing application 165, using a fencing module, can determine whether a split-brain condition exists in cluster 120 as a result of the cluster partitioning and whether the split-brain condition is caused by one or more application instances executing on one or more nodes in the cluster (e.g., an "application-induced" split-brain condition as shown in FIG. 2B).

In other embodiments, fencing application 165 performs an application fencing operation to rectify the application split-brain condition by accessing AWM 160 and performing a partition arbitration process. In this example, and as part of performing the application fencing operation, fencing application 165 uninstalls, removes, or ejects application-aware registration key(s) of application instance(s) from coordination point(s) based on a result of the partition arbitration process (which is performed in the context of specific applications). The uninstalling, removing, or ejection, causes the termination of application instance(s) instead of node(s) on which the application instance(s) are executing.

Figure 5:
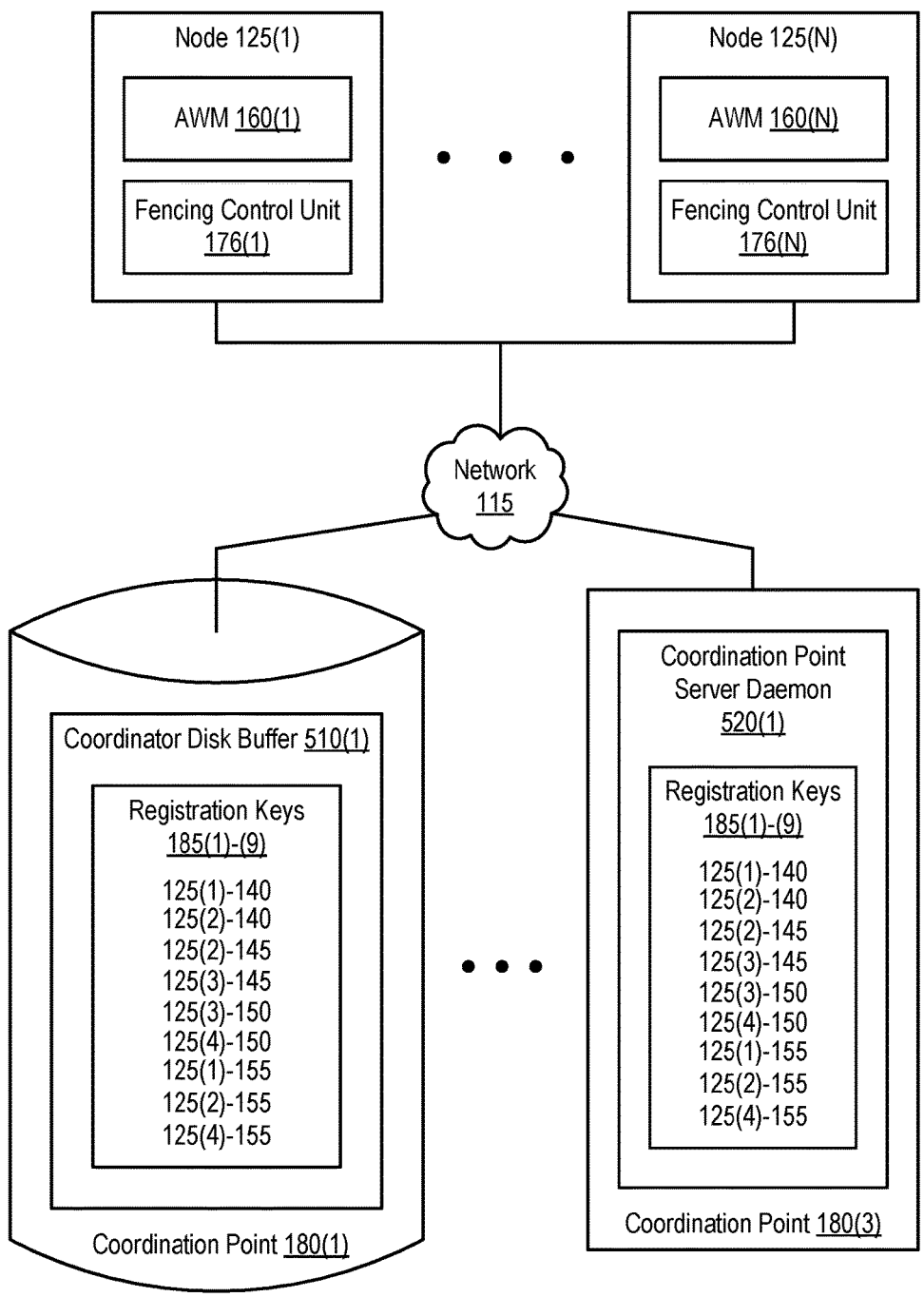
FIG. 5 is a block diagram of a computing system that registers application-aware registration keys on coordination points, according to one embodiment of the present disclosure.

FIG. 5 is a block diagram of a computing system that registers application-aware registration keys on coordination points, according to one embodiment. As previously noted, coordination points can be implemented in a cluster to assist with fencing operations. Coordination points provide a lock mechanism to determine which nodes are allowed to fence off shared storage (e.g., data drives 195(1)-(N)) from other nodes in the cluster. For example, a node (e.g., a racer node) must eject the registration key of a peer node from a coordination point (e.g., from a coordinator disk buffer 510(1) of coordination point 180(1) or from a coordinator point server daemon 520(1) of coordination point 180(3)) before that node is allowed to fence the peer node from shared storage. Coordination points can be either disks or servers, or both. Typically, and in one embodiment, cluster 120 includes at least three (3) coordination points, which can be a combination of disks and/or servers.

Disks that function as coordination points are called coordinator disks. In one embodiment, coordinator disks are three (3) standard disks or LUNs (Logical Unit Numbers) set aside for application fencing during cluster reconfiguration (e.g., before a cluster is formed). Coordinator disks (and coordination points) do not serve any other storage purpose in a cluster (e.g., such as data storage or inclusion in a disk group for user data). Any disks that support SCSI-3 Persistent Reservation (SCSI-3 PR) can be coordinator disks. In another embodiment, a coordination point can also be a server called a coordination point server. A coordination point server is a software solution that runs on a remote computing system or cluster. Therefore, regardless of whether a coordination point is a coordinator disk or a coordination point server, a coordination point permits node(s) in a cluster to at least: (1) register and become a member of a cluster, (2) determine which other nodes have successfully registered as members of the same cluster, (3) un-register from the cluster, and (4) forcefully un-register and preempt other nodes as members of the cluster.

In some embodiments, coordination points are, at a minimum, any combination of three (3) coordinator disks or coordination point servers that act together as a global lock device because racing for control of these coordination points (e.g., in a fencing race) is used to determine cluster membership. Because control of a cluster is granted to a node that gains control of (or wins) a majority of coordination points, it is preferable to have an odd number of coordination points (e.g., any odd number combination of coordinator disks and/or coordination point servers), though such is not strictly necessary. In one embodiment, a maximum of three (3) coordinator disks or coordination point servers (or any combination of the two) are implemented.

As previously noted, fencing can be used to ensure that only one partition (or sub-cluster) survives in a cluster which has experienced network partition such that only the surviving partition is able to write to shared storage. Application fencing, as described herein, uses a fencing race to determine which partition or sub-cluster gets to fence off application instances executing on the nodes in the other sub-cluster or partition. Because coordination points are used to manage access to shared storage, in one embodiment, the fencing race refers to nodes in different sub-clusters or partitions racing to gain access to (or reach) the majority of coordination points. Therefore, the fencing race refers to a partition or sub-cluster of nodes that has connectivity (or accessibility) to a majority of coordination points.

It should be noted that nodes in a sub-cluster (or partition) require access to a majority of coordination points because having just one coordination point available to a cluster can give rise to a single point of failure. For example, if a single coordination point fails for any reason, the cluster can lose operational capabilities. Further, using two (2) (or an even number of) coordination points (e.g., four (4), six (6), etc.) can result in a situation where no sub-cluster can definitively win a fencing race because node(s) in different sub-clusters can access (and win) the same number of, but albeit different, coordination points (e.g., in a situation where a cluster is partitioned into two sub-clusters with two (2) or four (4) available coordination points).

Therefore, using a single coordination point or an even number of coordination points can result in nodes in both sub-clusters writing data to shared storage, thus causing data corruption. Therefore, to keep a desired partition operational in a cluster that has been partitioned, a node in a sub-cluster, either alone or in combination with other nodes in that sub-cluster, must be able to access (and win) a majority of the coordination points available to the cluster (e.g., a task that can only be accomplished definitively in all situations if an odd number of coordination points are made available).

It will be appreciated that coordination points 180(1)-(N) generally represent any type or form of computing device that is capable of performing or being used to perform application fencing decisions (e.g., coordination point 180(1) may be used to resolve application split-brain scenarios for cluster 120 subsequent to a partitioning event). Coordination points 180(1)-(N) may represent one or more coordination disks and/or one or more coordination servers that can be used to make application fencing decisions. Examples of coordination points 180(1)-(N) include, without limitation, application servers and database servers configured to provide various database services and/or run certain software applications, storage devices (such as disks or disk arrays), laptops, desktops, cellular phones, personal digital assistants (PDAs), multimedia players, embedded systems, and/or combinations of one or more of the same.

Figure 6:
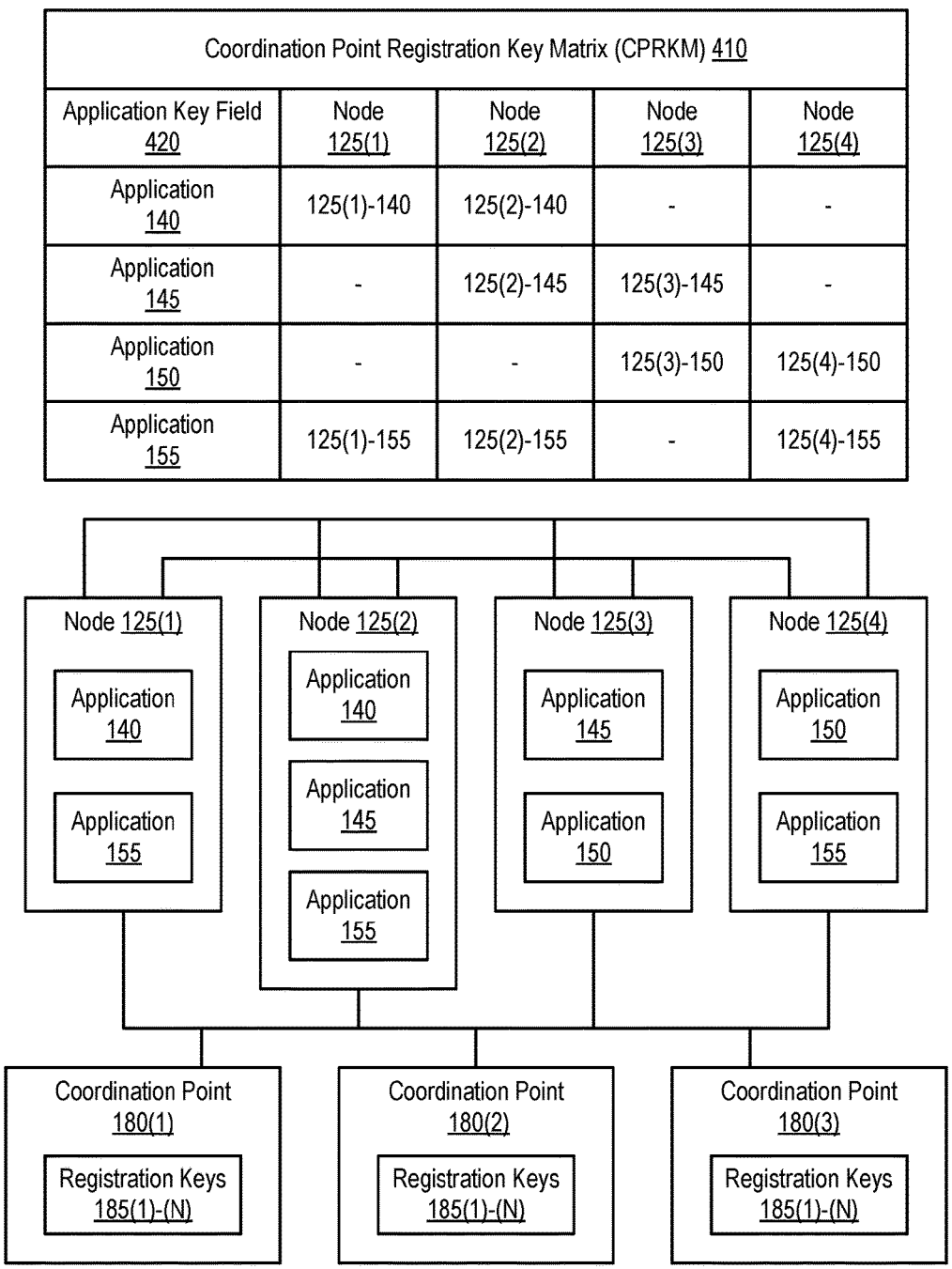
FIG. 6 is a block diagram of nodes that store application-aware registration keys on coordination points, according to one embodiment of the present disclosure.

FIG. 6 is a block diagram of nodes that install application-aware registration keys on coordination points as part of joining a cluster, according to one embodiment. As shown in FIG. 6, node 125(1) executes applications 140 and 145, node 125(2) executes applications 140, 145, and 155, node 125(3) executes applications 145 and 150, and node 125(4) executes applications 150 and 155. For example, when node 125(1) joins cluster 120, node 125(1) installs two application-aware registration keys (e.g., 125(1)-140 and 125(1)-155) on coordination points 180(1), 180(2), and 180(3). When node 125(2) joins cluster 120, node 125(2) installs three application-aware registration keys (e.g., 125(2)-140, 125(2)-145, and 125(2)-155) on coordination points 180(1), 180(2), and 180(3). When node 125(3) joins cluster 120, node 125(3) installs two application-aware registration keys (e.g., 125(3)-145 and 125(3)-150) on coordination points 180(1), 180(2), and 180(3). Finally, when node 125(4) joins cluster 120, node 125(4) installs two application-aware registration keys (e.g., 125(4)-150 and 125(4)-155) on coordination points 180(1), 180(2), and 180(3). These installed application-aware registration keys are stored on each of coordination points 180(1), 180(2), and 180(3) as registration keys 185(1)-(9). In some embodiments, CPRKM 410 can also be stored on coordination points 180(1), 180(2), and 180(3) along with registration keys 185(1)-(9).

An Example of Performing Partition Arbitration Based on Application Weight

Figure 7:
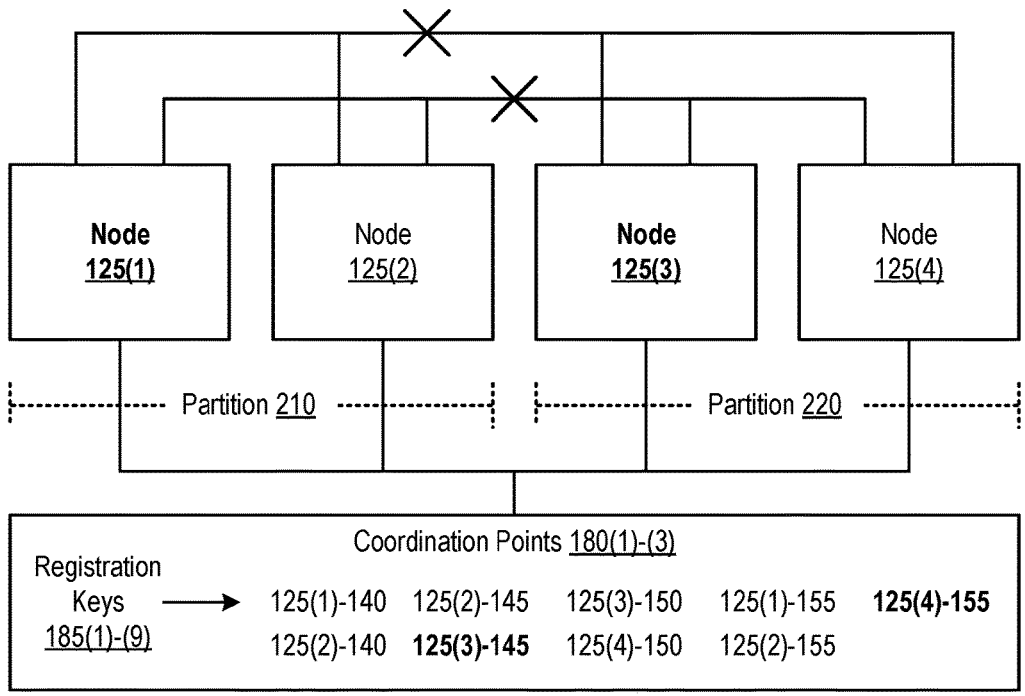
FIG. 7 is a block diagram of racer nodes that perform application-aware partition arbitration, according to one embodiment of the present disclosure.

FIG. 7 is a block diagram of racer nodes that perform application-aware partition arbitration, according to one embodiment. Prior to performing a fencing race, a sub-cluster elects a racer node. A racer node is a node that is designated by a sub-cluster to determine whether it can access one or more coordination points available to the cluster (as a whole). Typically, a racer node is chosen by the cluster (or designated) based on a node identifier. However, it should be noted that other methods of choosing and/or designating a racer node other than by node identifier are also contemplated.

As shown in FIG. 7, upon a cluster partitioning event, partition 210 selects node 125(1) as the racer node for partition 210, and partition 220 selects node 125(3) as the racer node for partition 220. In some embodiments, fencing module 175(1) of node 125(1) performs an application fencing operation by installing an identifier on one or more coordination points. In this example, the identifier associates an instance of an application with a node on which the instance of the application is executing. Fencing module 175(1) then determines a weight assigned to the instance of the application, and terminates the instance of the application, based, at least in part, on the weight.

For example, AWM 160, as shown in FIG. 7, indicates that all instances of application 140 execute on partition 210 (e.g., on nodes 125(1) and 125(2)) because the weight of application 140 for nodes 125(3) and 124(4) according to AWM 160 is zero. Therefore, if all instances of an application are running on the same partition, fencing module 175(1) permits application 140 to continue running on nodes 125(1) and 125(2) without performing an application fencing operation, as the application fencing operation is not necessary (e.g., there is no split-brain condition in cluster 120). Similarly, AWM 160 indicates that all instances of application 150 execute on partition 220 (e.g., on nodes 125(3) and 125(4)) because the weight of application 150 for nodes 125(1) and 125(2) is zero. Therefore, fencing module 175(3) permits application 150 to continue running on nodes 125(3) and 125(4) without performing a fencing operation, as the application fencing operation is not necessary (e.g., there is no split-brain condition in cluster 120).

However, if various instances of an application are running on two separate partitions created as a result of cluster partitioning, fencing module performs an application fencing operation that results in the termination of instance(s) of an application that are executing or running on a loser partition (e.g., based on a weight assigned to that application in AWM 160). In this manner, and as part of performing an application fencing operation, fencing application 165 causes termination of the instance of the application instead of the node on which the instance of the application is executing.

For example, fencing application 165 can determine whether cluster 120 is partitioned into network partitions (e.g., partitions 210 and 220). Fencing application 165 can access AWM 160 and perform a partition arbitration process using AWM 160. If an application is executing on two separate partitions (e.g., application 145 which executes on node 125(2) that is part of partition 210, and node 125(3) which executes of node 125(3) that is part of partition 220), the partition arbitration process can include performing a fencing race to determine a winner partition and a loser partition.

As previously noted, fencing application 165 does not perform (and does not need to perform) a fencing race if all instances of an application execute on nodes that are part of the same network partition (e.g., applications 140 and 150). Conversely, fencing application 165 performs a fencing race if an instance of an application and other instances of the same application, execute on separate network partitions (e.g., applications 145 and 155).

In some embodiments, the fencing race to determine the winner partition and loser partition(s) is decided based on information in AWM 160. In this example, and as part of performing the fencing race, the method uninstalls or ejects the (application-aware) registration key for the instance of the application from a coordination point based on the weight assigned to the instance of the application. For example, and as shown in FIG. 7, there are four (4) nodes cluster 120—nodes 125(1)-(4). Upon a cluster partitioning event, two partitions are created—partition 210 and partition 220. Each partition elects one racer node. For instance, partition 210 elects node 125(1) (shown in bold in FIG. 7) as the racer node for partition 210, and partition 220 elects node 125(3) (shown in bold in FIG. 7) as the racer node for partition 220.

Nodes 125(1) and 125(3) begin a fencing race independently. If node 125(1) can access (or reach) one or more coordination points before node 125(3), fencing application 165 starts the fencing race with the racer node (e.g., node 125(1)) to "win" (or claim) the coordination point by ejecting, removing, or uninstalling the application-aware registration keys of node 125(3) from that coordination point (e.g., 125(3)-145), thus preempting node 125(3) from winning that coordination point. In this example, node 125(1), which is the racer node for partition 210 accesses AWM 160(1) and identifies the number of applications that are running in partition 210 versus partition 220 to determine whether there is an application-induced split-brain condition in cluster 120. Because application 145 causes an application split-brain condition, node 125(1) instructs the coordination point to remove (or eject) the registration key for node 125(3) from the coordination point. In this manner, node 125(1) wins the race for the coordination point.

In some embodiments, fencing application 165 can fine tune the behavior of cluster 120, for example, by determining a total application weight in cluster 120 (e.g., 48) and then determining a partition weight of applications each partition is executing. If each partition has a different partition weight, then fencing application 165 can introduce a delay to the fencing race to ensure that a more critical partition can win the fencing race. If both partitions have the same partition weight (e.g., for application 145), both partitions can enjoy the same preference. For example, node 125(3) can win the fencing race in the above example based on factors such as network delay, bandwidth, device performance, and the like.

In the case of application 155, an application-induced split-brain condition exists because the total application weight of 24 is split between partition 210 (16) and partition 220 (8). Therefore, because an application split brain condition exists for application 155, the racer node (e.g., node 125(1)) removes, ejects, or uninstalls the application-aware registration key 125(4)-155 from the coordination point (e.g., because partition 210 has a higher weight in totality compared to partition 220).

Because application-aware registration keys 125(3)-145 and 125(4)-155 are ejected, deleted, removed, or uninstalled from the coordination point, when the racer node for partition 220 (e.g., node 125(3)) reaches the coordination point, the racer node will not find the application-aware registration keys 125(3)-145 and 125(4)-155. As a result, the racer node for partition 220 will terminate competing applications (e.g., applications 145 and 155) from nodes 125(3) and 125(4) respectively, without terminating nodes 125(3) and 125(4) themselves. In this manner, the application-induced split-brain condition is rectified and nodes 125(3) and 125(4) can continue to execute application 150.

Processes for Performing Application-Aware Fencing Operations

Figure 8B:
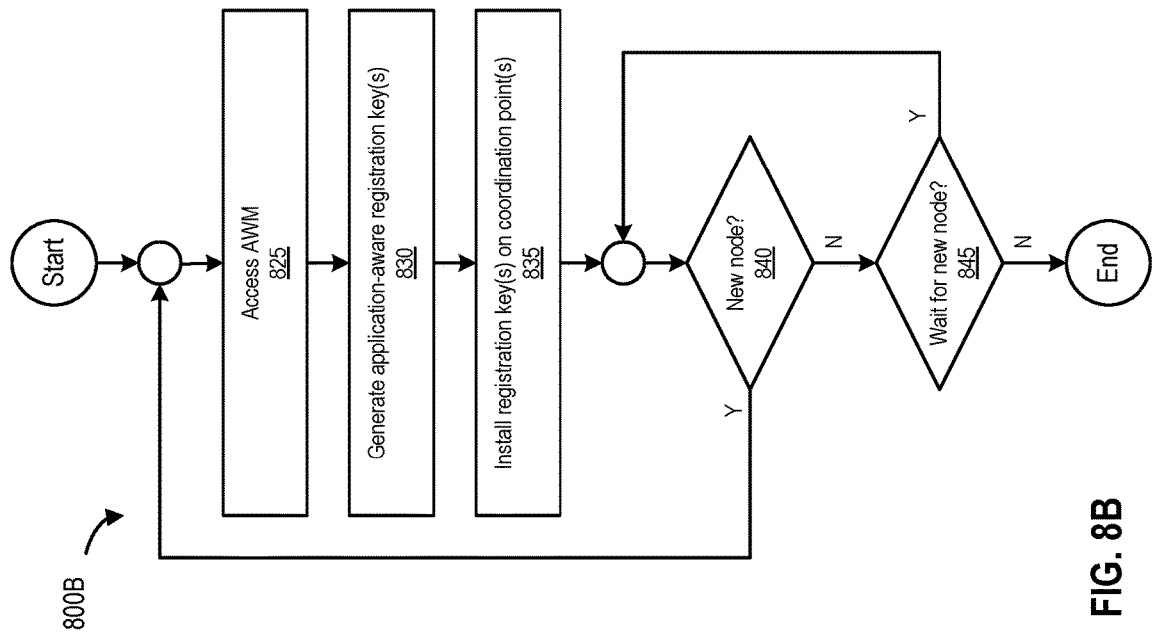
FIG. 8B is a flowchart of a process for generating application-aware registration keys, according to one embodiment of the present disclosure.
Figure 8A:
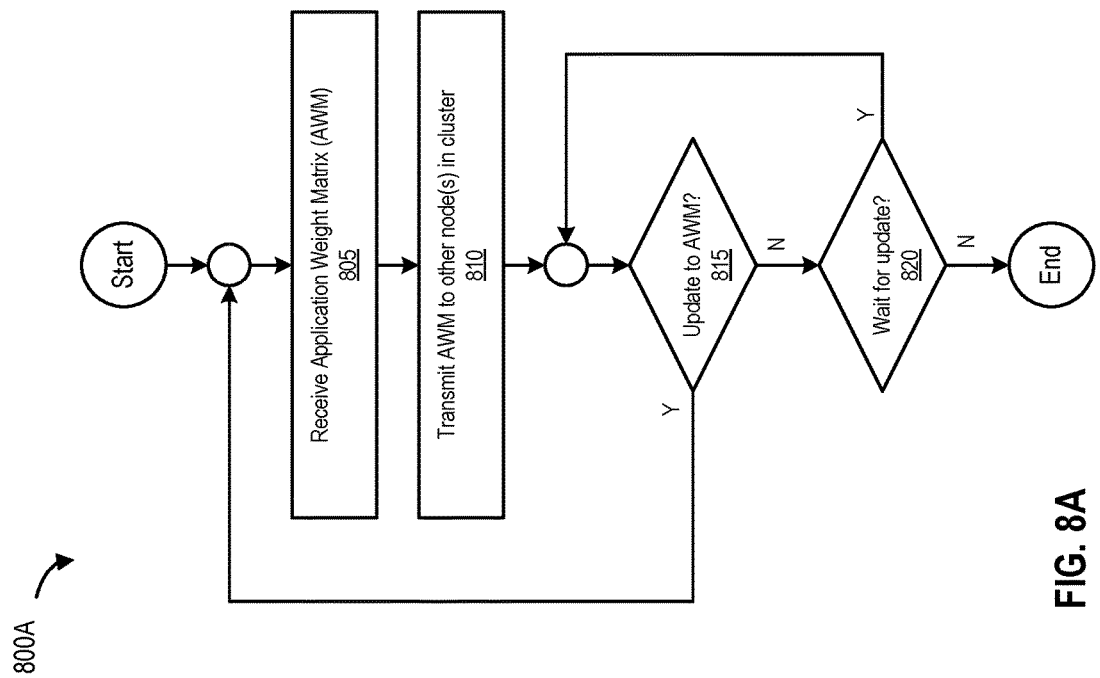
FIG. 8A is a flowchart of a process for receiving an application weight matrix, according to one embodiment of the present disclosure.

FIG. 8A is a flowchart of a process for receiving an application weight matrix, according to one embodiment. The process begins at 805 by receiving an application weight matrix (e.g., AWM 160 from a computing device that is not part of cluster 120). At 810, the process transmits the AWM to other node(s) in the cluster. For example, node 125(1) can receive AWM 160 from configuration system 105 as part of configuration file 110 and transmit AWM 160 to nodes 125(2), 125(3), and the like.

At 815, the process determines whether there is an update to the AWM. If there is an update the AWM, the process loops to 805 and receives the (updated) AWM and re-transmits the (updated) AWM to the other nodes in the cluster. If there is no update to the AWM, at 820, the process determines whether to wait for an update. If waiting is required, the process loops to 815 and determines if there is an update (and if there is indeed an update, loops to 805, as noted above). However, if no waiting is required, the process ends.

FIG. 8B is a flowchart of a process for generating application-aware registration keys, according to one embodiment. The process begins at 825 by accessing an AWM. For example, node 125(1) can access AWM 160(1). At 830, the process generates application-aware registration key(s) based on the information in the AWM (e.g., based on which applications are executing on which nodes in cluster 120). At 835, the process installs, registers, or places the generated application-aware registration key(s) on one or more coordination points.

At 840, the process determines whether there is a new node in the cluster. If a new node has joined the cluster, the process loops to 825 and generates registration key(s) for the new node based on the applications that are executing on the new node and installs the (new) registration key(s) on the one or more coordination points. However, if a new node has not joined the cluster, the process, at 845, determines whether there is a need to wait for a new node. If there is such a need, the process loops back to 840. If there is no such need, the process ends.

Figure 9A:
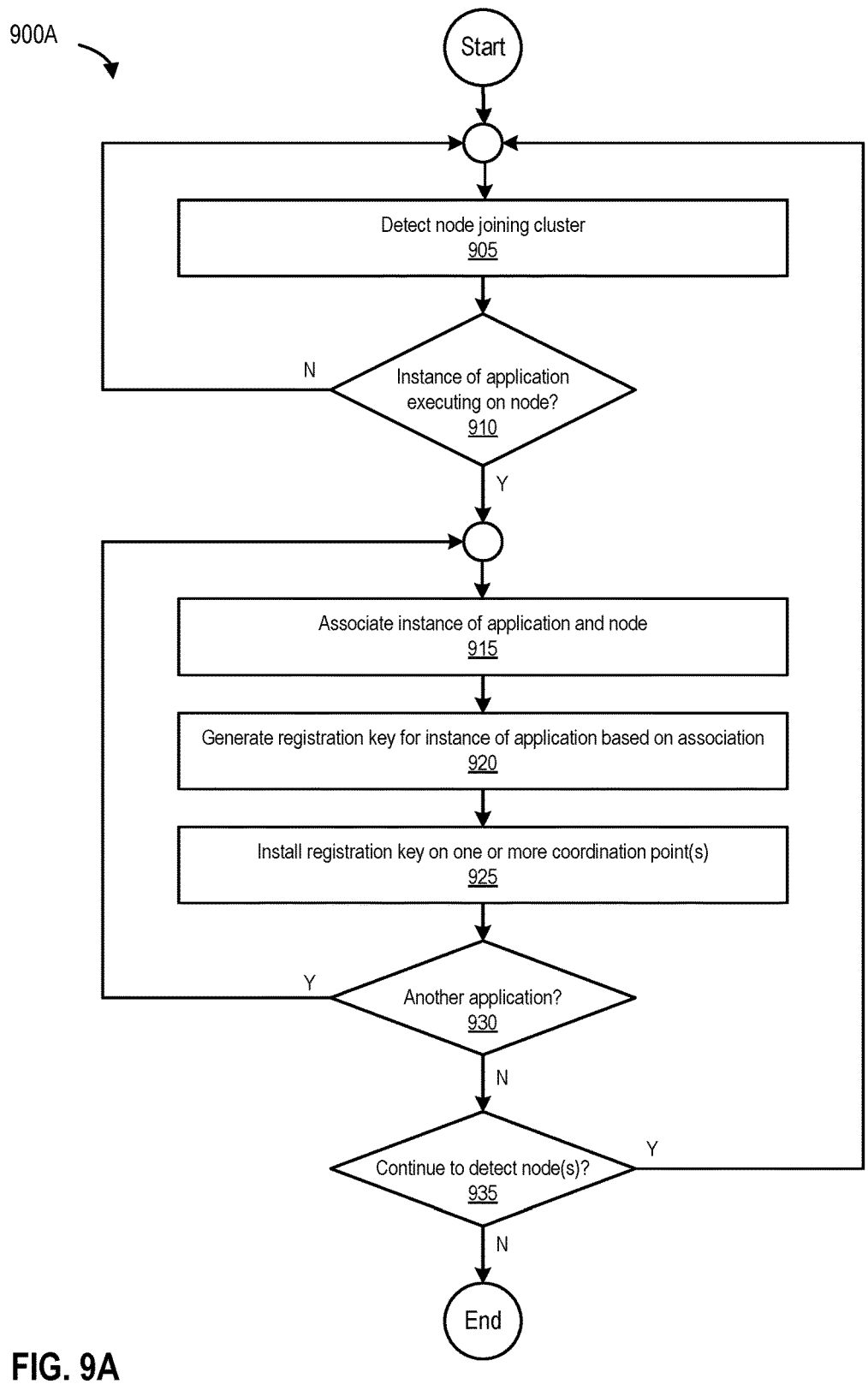
FIG. 9A is a flowchart of a process for installing application-aware registration keys on coordination points, according to one embodiment of the present disclosure.

FIG. 9A is a flowchart of a process for installing application-aware registration keys on coordination points, according to one embodiment. The process begins at 905 by detecting a node joining a cluster or waiting to find a new node. At 910, the process determines whether there are (one or more) instances of application(s) executing on the node. If there are no applications executing on the node, the process loops back to 905 and detects whether another node joins the cluster. If there are instance(s) of application(s) executing on the node, the process, at 915, associates the instance(s) of the application(s) and the node.

At 920, the process generates (application-aware) registration key(s) for the instance(s) of the application(s) based on the association. At 925, the process installs the registration key(s) on one or more coordination points (e.g., on an odd number of coordination points greater than three). At 930, the process determines if there is another application (or application instance) that has begun to execute on the node. If so, the process loops back to 915, and generates and installs a new registration key on the coordination points. If not, the process, at 935, determines whether there is a need to continue to detect node(s) that may join the cluster. If there is such a need, the process loops back to 905. If there is no such need, the process ends.

Figure 9B:
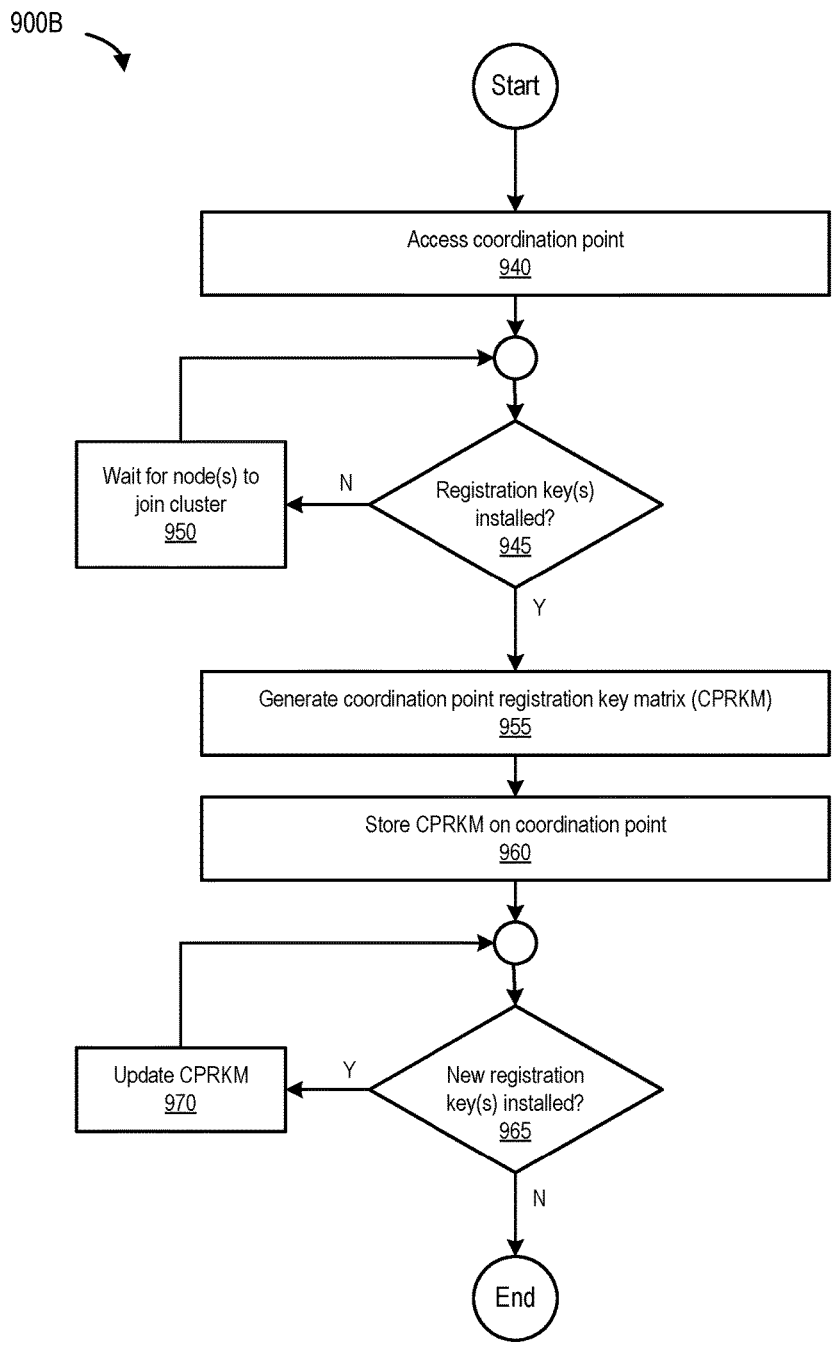
FIG. 9B is a flowchart of a process for generating a coordination point registration key matrix, according to one embodiment of the present disclosure.

FIG. 9B is a flowchart of a process for generating a coordination point registration key matrix, according to one embodiment. The process begins at 940 by accessing a coordination point. At 945, the process determines whether there is any registration key(s) installed on the coordination point. If no registration key(s) are installed, the process, at 950, waits for node(s) to join the cluster. However, if registration key(s) are installed on the coordination point, the process, at 955, generates a coordination point registration key matrix (e.g., CPRKM 410).

At 960, the process stores the CPRKM on the coordination point (e.g., along with the installed registration key(s)). As previously noted, the generation and storing of the CPRKM is optional. At 965, the process determines whether new registration key(s) are installed on the coordination point. If new registration keys are installed, the process, at 970, updates the CPRKM. However, if no new registration keys are installed, the process ends.

Figure 10:
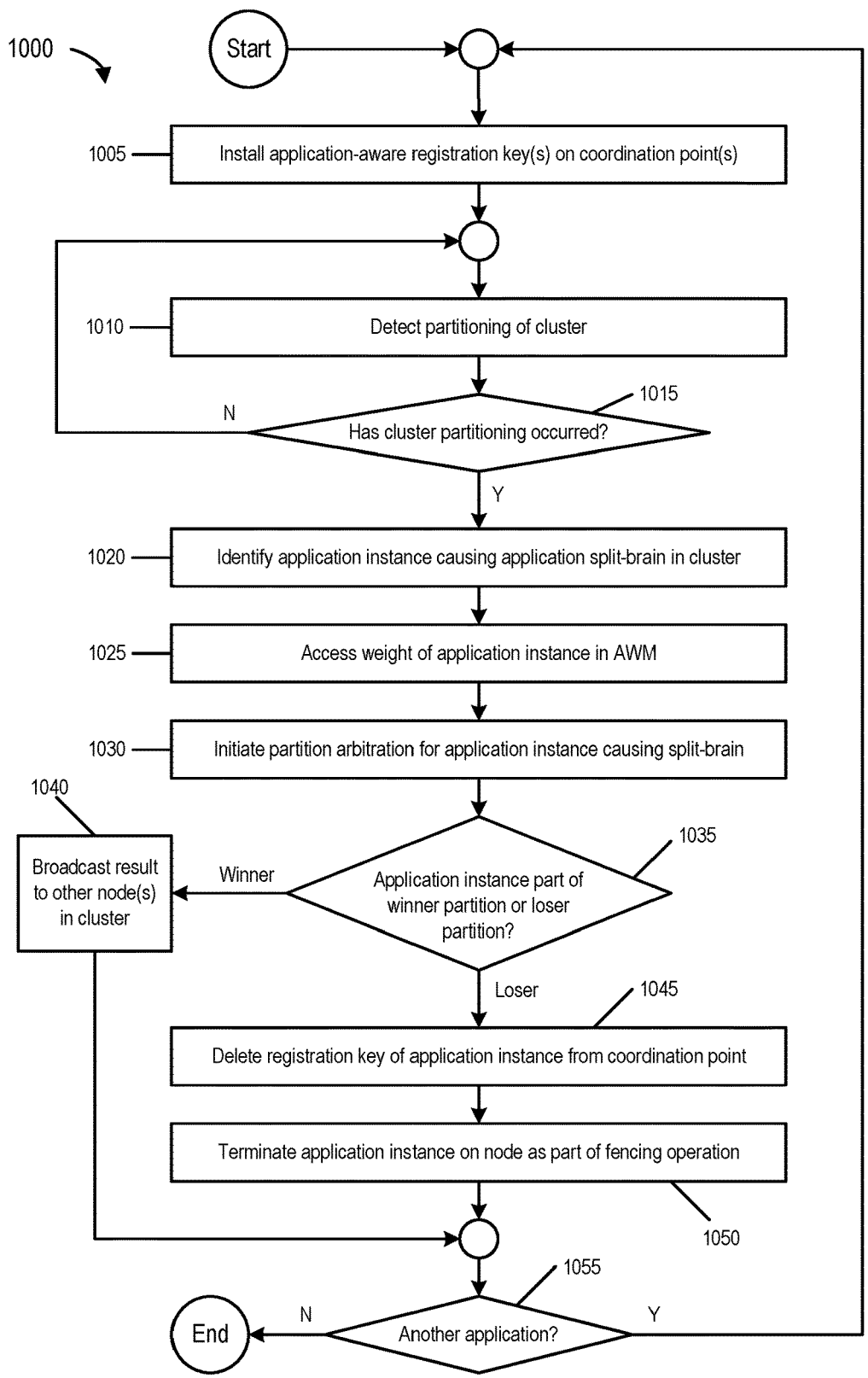
FIG. 10 is a flowchart of a process for performing an application fencing operation, according to one embodiment of the present disclosure.

FIG. 10 is a flowchart of a process for performing an application fencing operation, according to one embodiment. The process begins at 1005 by installing application-aware registration key(s) on coordination point(s). At 1010, the process detects partitioning of the cluster (e.g., cluster 120). At 1015, the process determines whether cluster partitioning has occurred. If cluster partitioning has not occurred, the process reverts to detecting partitioning of the cluster. However, if the cluster has indeed been partitioned, the process, at 1020, identifies an application instance that is causing an application split-brain condition in the cluster (or an application-induced split-brain condition).

At 1025, the process accesses a weight assigned to the application instance that is causing the application split-brain condition in the cluster in the AWM. At 1030, the process initiates partition arbitration for the application instance that is causing the split-brain condition. At 1035, the process determines whether the application instance is part of a winner partition or a loser partition (e.g., as a result of performing a fencing race as part of the partition arbitration process). If the application instance is part of a winner partition, the process, at 1040, broadcasts the result to the other node(s) in the cluster.

However, if the application instance is part of a loser partition, the process, at 1045, deletes, removes, uninstalls, or ejects the (application-aware) registration key of the application instance from the coordination point, and at 1050, terminates the application instance on the node as part of the fencing operation. At 1055, the process determines whether there is another application. If there is another application (or application instance), the process loops back to 1005. If there are no more application(s), the process ends.

Figure 11:
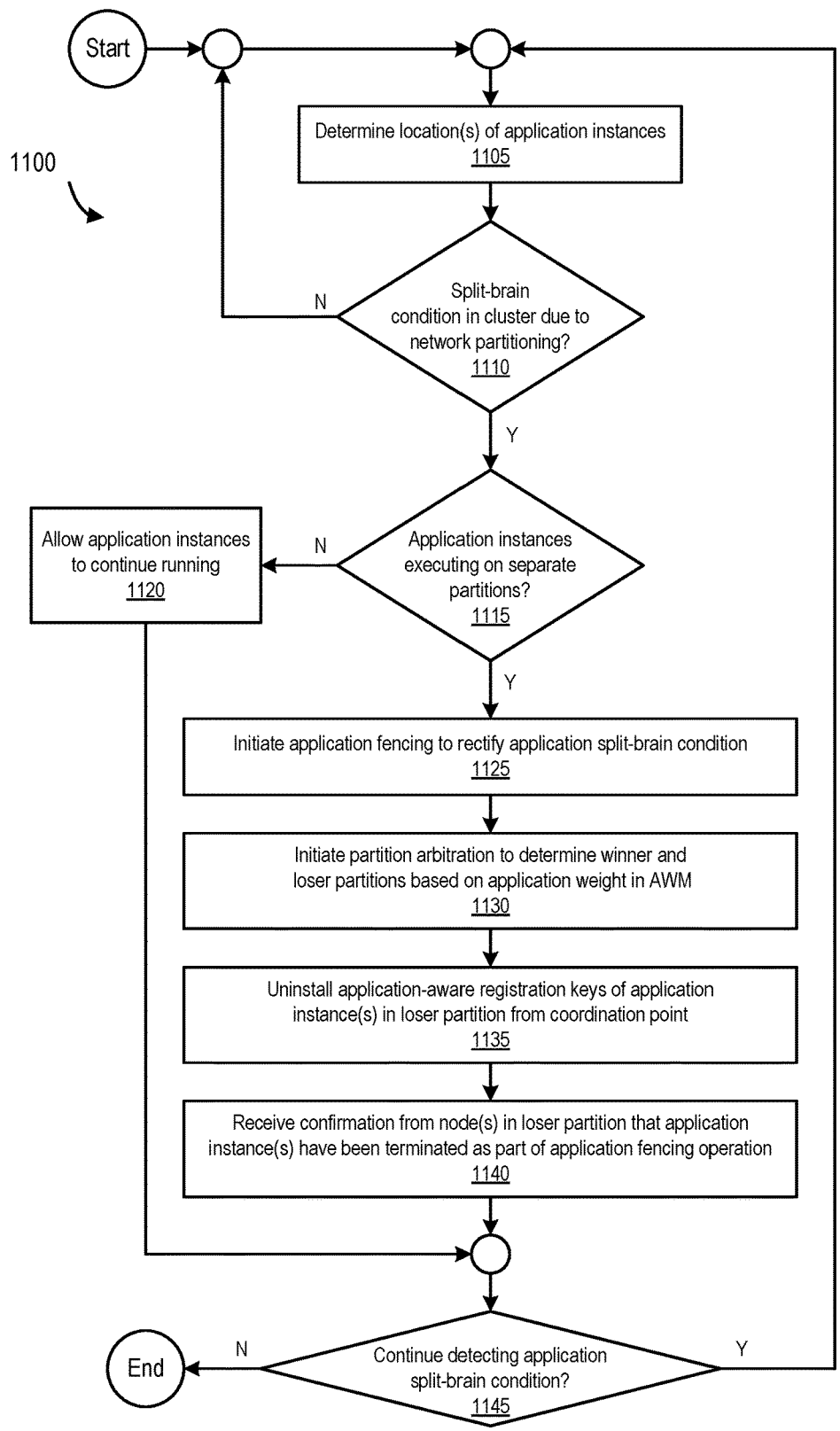
FIG. 11 is a flowchart of a process for uninstalling application-aware registration keys from coordination points, according to one embodiment of the present disclosure.

FIG. 11 is a flowchart of a process for uninstalling application-aware registration keys from coordination points, according to one embodiment. The process begins at 1105 by determining location(s) of application instances (e.g., the various nodes on which the application instance(s) are executing as specified in an AWM). At 1110, the process determines whether there is a split-brain condition in the cluster because of network partitioning. If there is no split-brain condition in the cluster due to the network partitioning, the process loops back to 1105. However, if there is a split-brain condition in the cluster due to the network partitioning, the process, at 1115, determines whether application instances are executing on separate partitions.

If the application instances are not executing on separate partitions, the process, at 1120, allows the application instances to continue running (e.g., because there is no application-induced split-brain and there is no need to perform a fencing face). However, if the application instances are executing on separate partitions, the process, at 1125, initiates a fencing operation to rectify the application split-brain condition. As part of the fencing operation, the process, at 1130, initiates a partition arbitration process that includes a fencing race to determine winner and loser partitions (or node groups) based on application weight specified in the AWM.

At 1135, the process uninstalls, deletes, removes, or ejects application-aware registration keys of application instance(s) in loser partition(s) from coordination point(s), and at 1140 receives confirmation from node(s) in loser partition(s) that the application instance(s) have been terminated as part of the application fencing operation. At 1145, the process determines if there is a need to continue to detect an application-induced split-brain condition. If there is such a need, the process loops to 1105. If there is no such need, the process ends.

Figure 12:
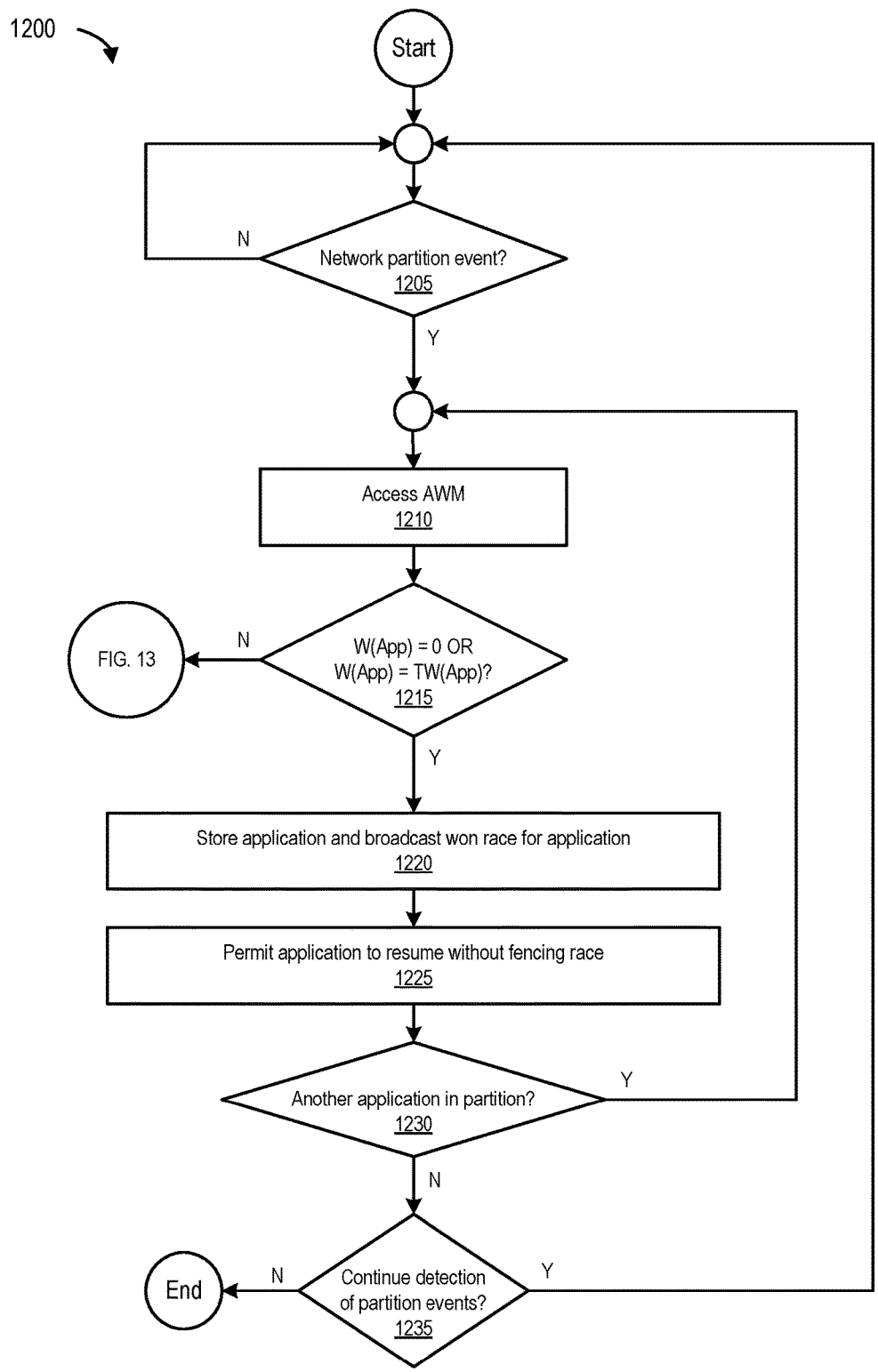
FIG. 12 is a flowchart of a process for performing an application fencing operation, according to one embodiment of the present disclosure.

FIG. 12 is a flowchart of a process for performing an application fencing operation, according to one embodiment. The process begins at 1205 by determining if there is there network partitioning event. If there is a network partitioning event, the process, at 1210, accesses an AWM. At 1215, the process determines whether a weight of an application in a given partition is zero, or whether the weight of the application in the given partition is equal to a total weight of the application across the whole cluster (e.g., before the cluster was partitioned). If the weight of an application in the given partition not zero, or if the weight of the application in the given partition not is equal to the total weight of the application across the whole cluster, the process proceeds to FIG. 13.

If the weight of the application in the given partition is zero, the application is not running or executing in the given partition. If the weight of the application in the given partition is equal to the total weight of the application across the whole cluster, the application is running or executing entirely in the given partition. In both cases, there is no application split-brain condition, and fencing application 165 can determine that the application has (preemptively) won the fencing race (e.g., without needing to perform such a race and without needing to access coordination points as part of performing such a race). Fencing application 165 flags the application for broadcast and notifies the other node(s) in the cluster that there is no application-induced split-brain condition that needs rectification. Therefore, at 1220, the process stores the application and broadcasts a "won race" for the application, and at 1125, permits the application to resume (operations) without (performing) a fencing race. At 1230, the process determines if there is another application in the (given) partition. If there is another application, the process loops back to 1210. If not, the process ends at 1235.

Figure 13:
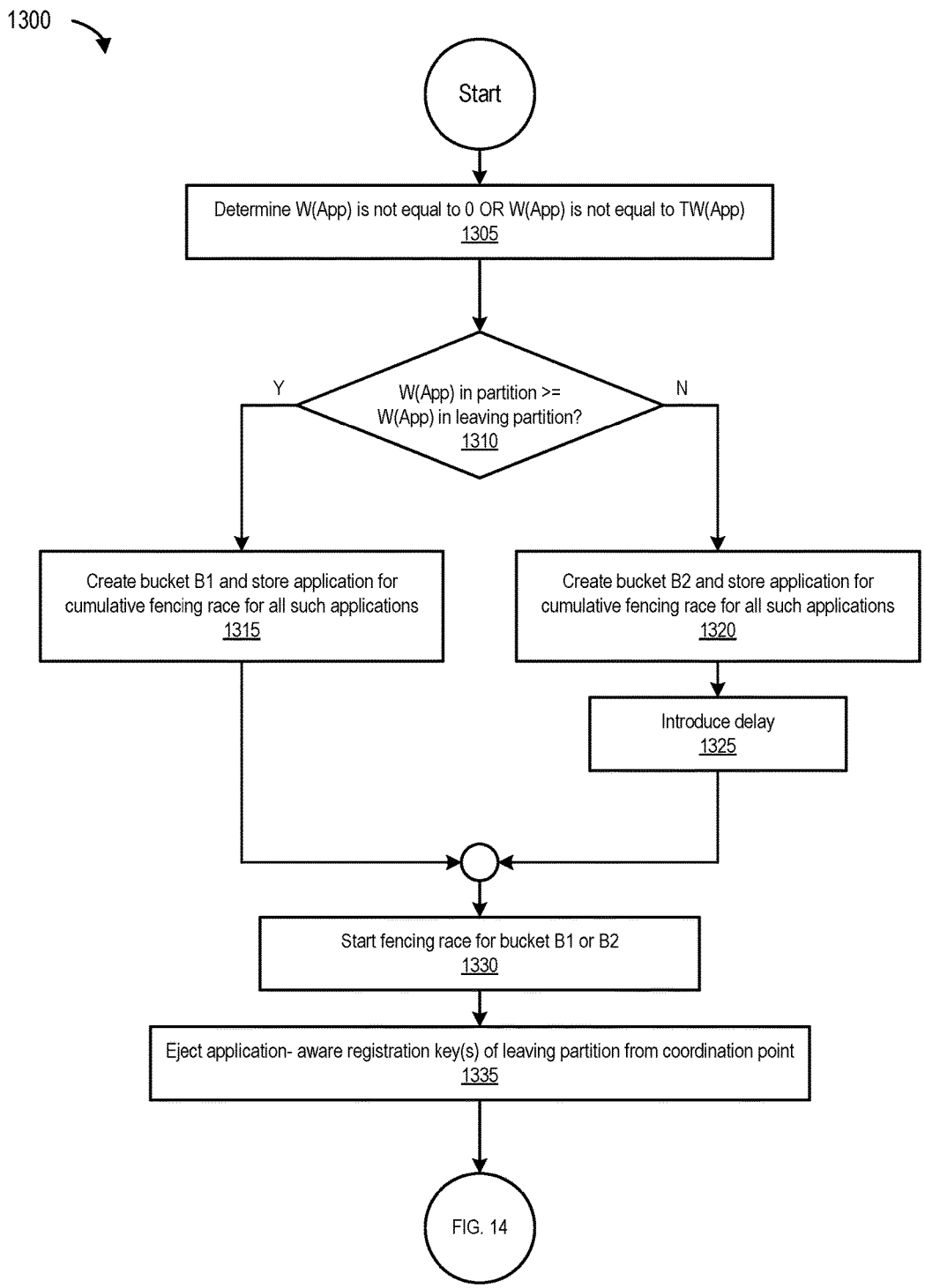
FIG. 13 is a flowchart of a process for performing an application fencing operation, according to one embodiment of the present disclosure.

FIG. 13 is a flowchart of a process for performing an application fencing operation, according to one embodiment. The process begins at 1305 by determining that the weight of an application in the given partition is not zero, or the weight of the application in the given partition not is equal to the total weight of the application across the whole cluster. At 1310, the process determines whether the weight of the application in the given partition is greater than or equal to the weight of the application in another partition (e.g., a leaving partition).

If the weight of the application in the given partition is greater than or equal to the weight of the application in another partition, the process, at 1315, creates a bucket B1 and stores the application for a cumulative fencing race for all such applications (e.g., all application where the weight of such applications in the given partition is greater than or equal to the weight of such applications in another partition). In one embodiment, a cumulative fencing race can improve the speed and performance of fencing operations by permitting a node in a cluster to submit a single request to a coordination point to remove, delete, uninstall, boot, or eject multiple application-aware registration key(s). In another embodiment, buckets B1 and B2 are arrays, and can be maintained by a racer node.

However, if the weight of the application in the given partition is not greater than or equal to the weight of the application in another partition, the process, at 1320, creates a bucket B2 and stores the application for a cumulative fencing race for all such applications (e.g., all application where the weight of such applications in the given partition is not greater than or equal to the weight of such applications in another partition). At 1325, the process introduces a delay. For example, if the application has a greater weight in the given partition (e.g., partition 210) compared to another partition (e.g., partition 220), then the given partition can commence the fencing race immediately, and the another partition can introduce the delay. Therefore, at 1330, the process starts the fencing race for bucket B1 or B2. The process ends at 1135 by ejecting or uninstalling application-aware registration key(s) of the leaving partition from coordination point(s).

In addition to buckets B1 and B2, several other buckets or arrays can be generated depending on the number of applications and the respective weights of these applications in different partitions. In one embodiment, a Bucket A can include applications whose instances are all running in the racer node's partition. In this case, fencing application 165 can preemptively declare a "won" race and notify other node(s) in the cluster because the coordination points do not have the application-aware registration key(s) for these nodes. In another embodiment, a Bucket B can include applications for which the application weight in the racer node's partition is more than the rest of the cluster. In this case, the racer node starts the fencing race without delay and removes the application-aware registration key(s) of the other partition(s) from coordination point(s). In some embodiments, a Bucket C can include applications for which the application weight in the racer node's partition is "w1"

units less than the rest of the cluster. In this case, the racer node begins the fencing race after a delay of "x" seconds. In other embodiments, a Bucket D can include applications for which the application weight in the racer's partition is "w1 to w2" units less than the rest of the cluster. In this case, the racer node begins the fencing race after a delay of "y" seconds. Therefore, in this manner, multiple buckets or arrays can be created or generated based on the number of applications executing on various nodes in the cluster and the respective weights of these application in the AWM.

Figure 14:
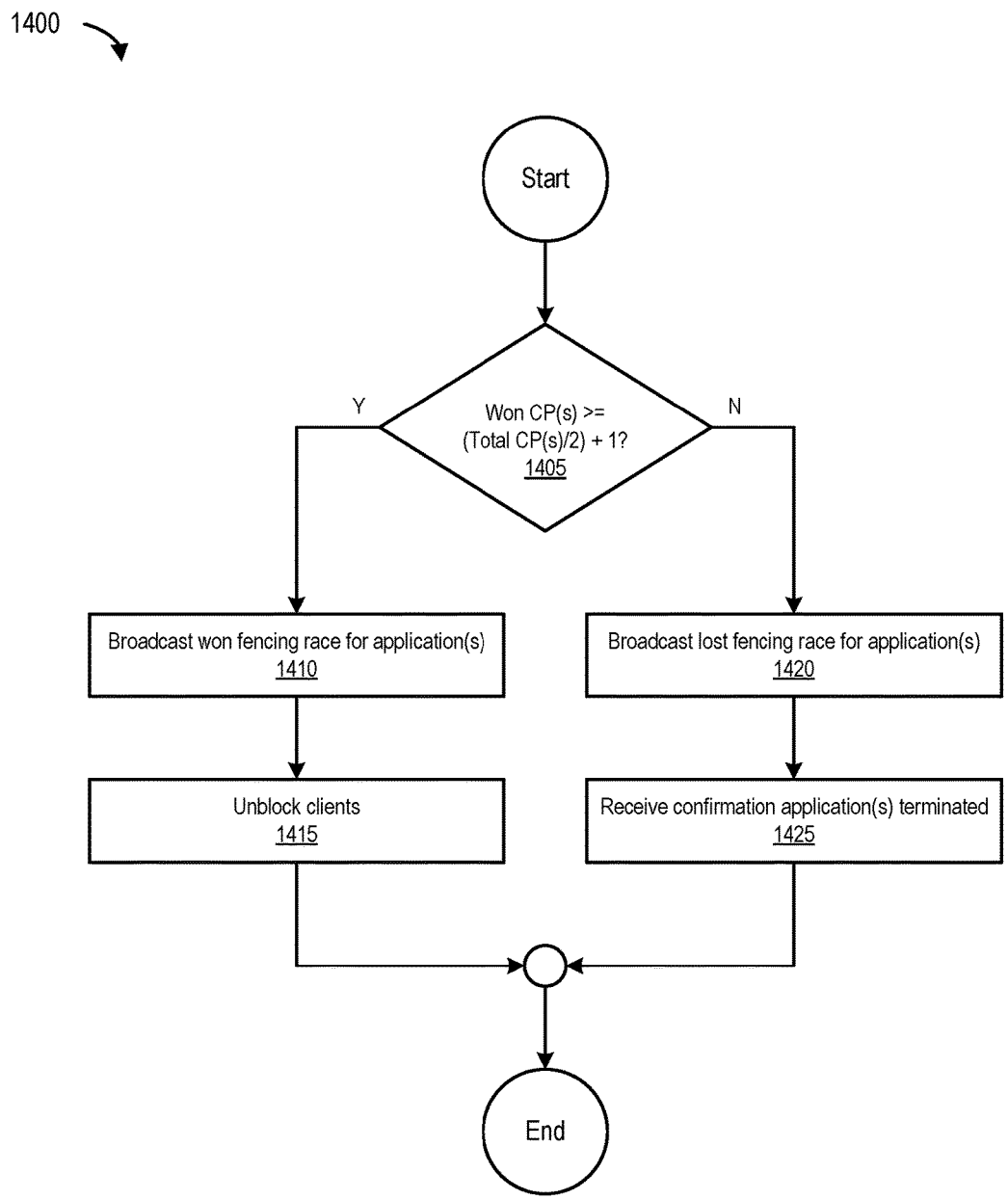
FIG. 14 is a flowchart of a process for performing an application fencing operation, according to one embodiment of the present disclosure.

FIG. 14 is a flowchart of a process for performing an application fencing operation, according to one embodiment. The process begins at 1405 by determining whether a number of coordination points won (e.g., by a racer node) is greater than or equal to a total number of coordination points divided by two plus one. If the number of coordination points won is greater than or equal to the total number of coordination points divided by two plus one, the process, at 1410, broadcasts a "won" fencing race for application(s) (e.g., in the racer node's partition), and ends at 1415 by unblocking clients (e.g., thus permitting access to shared storage). However, if the number of coordination points won is not greater than or equal to the total number of coordination points divided by two plus one, the process, at 1420, broadcasts a "lost" fencing race for application(s) (e.g., not in the racer node's partition), and ends at 1425 by receiving confirmation (e.g., from node(s) in the loser partition(s)) that application(s) (or application instance(s)) in the loser partition have been terminated.

It will be appreciated that the methods, systems, and processes disclosed herein perform application fencing operations by causing the termination of an instance of an application instead of terminating the node on which that instance of the application is executing, thus improving cluster availability and performance.

An Example Computing Environment

Figure 15:
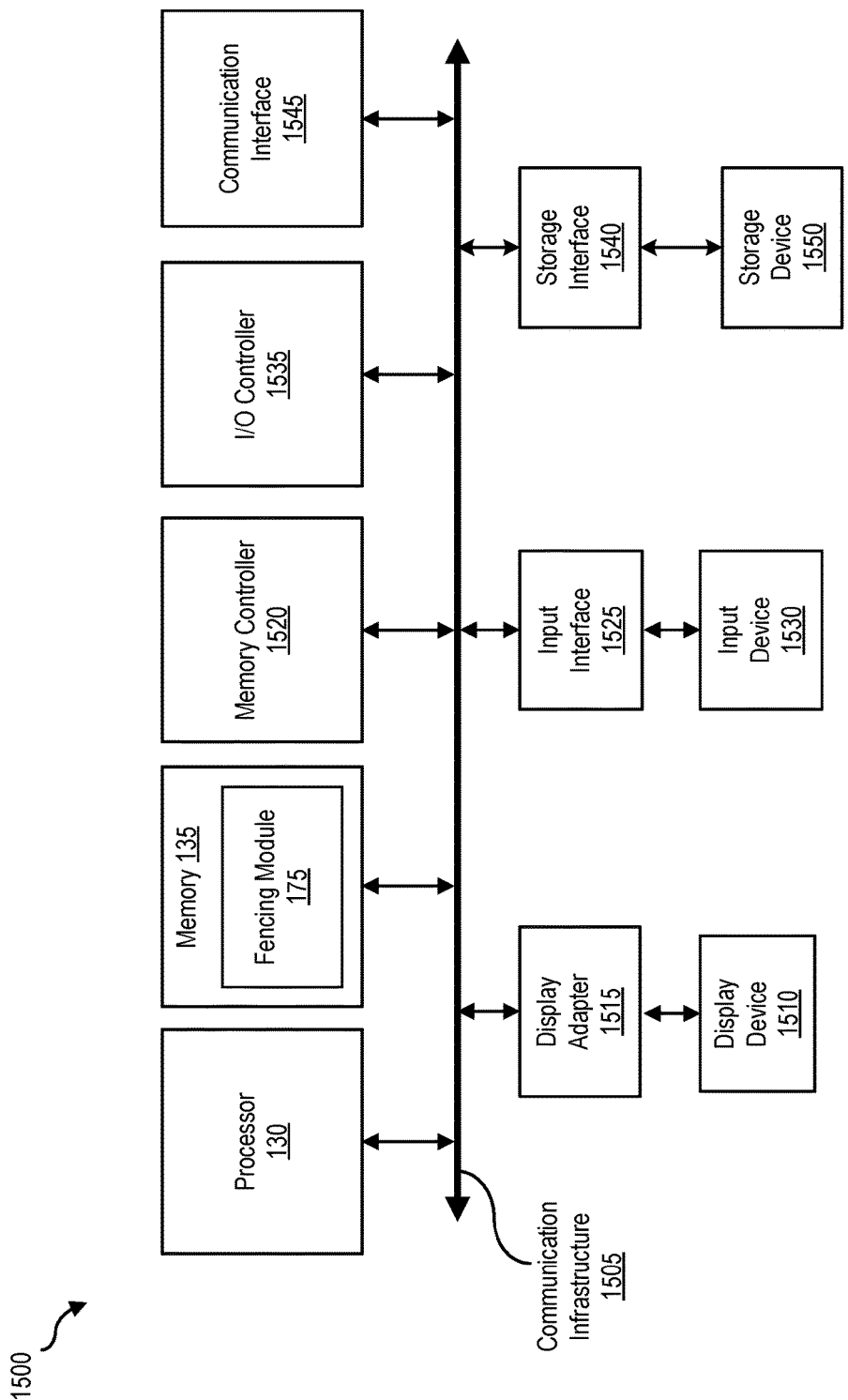
FIG. 15 is a block diagram of a computing system, illustrating how a fencing module can be implemented in software, according to one embodiment of the present disclosure.

FIG. 15 is a block diagram of a computing system, illustrating how a fencing module can be implemented in software, according to one embodiment. Computing system 1500 broadly represents any single or multi-processor computing device or system capable of executing computer-readable instructions. Examples of computing system 1500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array, tape drive, or hard drive controllers), and the like. Computing system 1500 may include at least one processor 130 and a memory 135. By executing the software that implements fencing module 175, computing system 1500 becomes a special purpose computing device that is configured to perform application-aware input-output (I/O) fencing operations.

Processor 130 generally represents any type or form of processing unit capable of processing data or interpreting and executing instructions. In certain embodiments, processor 130 may receive instructions from a software application or module. These instructions may cause processor 130 to perform the functions of one or more of the embodiments described and/or illustrated herein. For example, processor 130 may perform and/or be a means for performing all or some of the operations described herein. Processor 130 may also perform and/or be a means for performing any other operations, methods, or processes described and/or illustrated herein.

Memory 135 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 1500 may include both a volatile memory unit and a non-volatile storage device. In one example, program instructions implementing fencing module 175 may be loaded into memory 135.

In certain embodiments, computing system 1500 may also include one or more components or elements in addition to processor 130 and/or memory 135. For example, as illustrated in FIG. 15, computing system 1500 may include a memory controller 1520, an Input/Output (I/O) controller 1535, and a communication interface 1545, each of which may be interconnected via a communication infrastructure 1505. Communication infrastructure 1505 generally represents any type or form of infrastructure capable of facilitating communication between one or more components of a computing device. Examples of communication infrastructure 1505 include, without limitation, a communication bus (such as an Industry Standard Architecture (ISA), Peripheral Component Interconnect (PCI), PCI express (PCIe), or similar bus) and a network.

Memory controller 1520 generally represents any type/form of device capable of handling memory or data or controlling communication between one or more components of computing system 1500. In certain embodiments memory controller 1520 may control communication between processor 130, memory 135, and I/O controller 1535 via communication infrastructure 1505. In certain embodiments, memory controller 1520 may perform and/or be a means for performing, either alone or in combination with other elements, one or more of the operations or features described and/or illustrated herein.

I/O controller 1535 generally represents any type or form of module capable of coordinating and/or controlling the input and output functions of a virtual machine, an appliance, a gateway, a cluster, a node, and/or a computing system. For example, in certain embodiments I/O controller 1535 may control or facilitate transfer of data between one or more elements of cluster 120, coordination points 180(1)-(N), data disks 195(10-(N), and/or nodes 125(1)-(N), such as processor 130, memory 135, communication interface 1545, display adapter 1515, input interface 1525, and storage interface 1540.

Communication interface 1545 broadly represents any type or form of communication device or adapter capable of facilitating communication between computing system 1500 and one or more other devices. Communication interface 1545 may facilitate communication between computing system 1500 and a private or public network including additional computing systems. Examples of communication interface 1545 include, without limitation, a wired network interface (such as a network interface card), a wireless network interface (such as a wireless network interface card), a modem, and any other suitable interface. Communication interface 1545 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 1545 may also represent a host adapter configured to facilitate communication between computing system 1500 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 1545 may also allow computing system 1500 to engage in distributed or remote computing (e.g., by receiving/sending instructions to/from a remote device for execution).

As illustrated in FIG. 15, computing system 1500 may also include at least one display device 1510 coupled to communication infrastructure 1505 via a display adapter 1515. Display device 1510 generally represents any type or form of device capable of visually displaying information forwarded by display adapter 1515. Similarly, display adapter 1515 generally represents any type or form of device configured to forward graphics, text, and other data from communication infrastructure 1505 (or from a frame buffer, as known in the art) for display on display device 1510. Computing system 1500 may also include at least one input device 1530 coupled to communication infrastructure 1505 via an input interface 1525. Input device 1530 generally represents any type or form of input device capable of providing input, either computer or human generated, to computing system 1500. Examples of input device 1530 include a keyboard, a pointing device, a speech recognition device, or any other input device.

Computing system 1500 may also include storage device 1550 coupled to communication infrastructure 1505 via a storage interface 1540. Storage device 1550 generally represents any type or form of storage devices or mediums capable of storing data and/or other computer-readable instructions. For example, storage device 1550 may include a magnetic disk drive (e.g., a so-called hard drive), a floppy disk drive, a magnetic tape drive, an optical disk drive, a flash drive, or the like. Storage interface 1540 generally represents any type or form of interface or device for transferring and/or transmitting data between storage device 1550, and other components of computing system 1500.

Storage device 1550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 1550 may also include other similar structures or devices for allowing computer software, data, or other computer-readable instructions to be loaded into computing system 1500. For example, storage device 1550 may be configured to read and write software, data, or other computer-readable information. Storage device 11550 may also be a part of computing system 1500 or may be separate devices accessed through other interface systems.

Many other devices or subsystems may be connected to computing system 1500. Conversely, all of the components and devices illustrated in FIG. 15 need not be present to practice the embodiments described and/or illustrated herein, and the devices and subsystems referenced above may also be interconnected in different ways. Computing system 1500 may also employ any number of software, firmware, and/or hardware configurations. Embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1500 for storage in memory via a network such as the Internet or upon a carrier medium.

The computer-readable medium containing the computer program may be loaded into computing system 1500 and/or nodes 125(1)-(N). All or a portion of the computer program stored on the computer-readable medium may then be stored in memory 135 and/or various portions of storage device 1550. When executed by processor 130, a computer program loaded into computing system 1500 may cause processor 130 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1500 may be configured as an application specific integrated circuit (ASIC) adapted to implement one or more of the embodiments disclosed herein.

An Example Networking Environment

Figure 16:
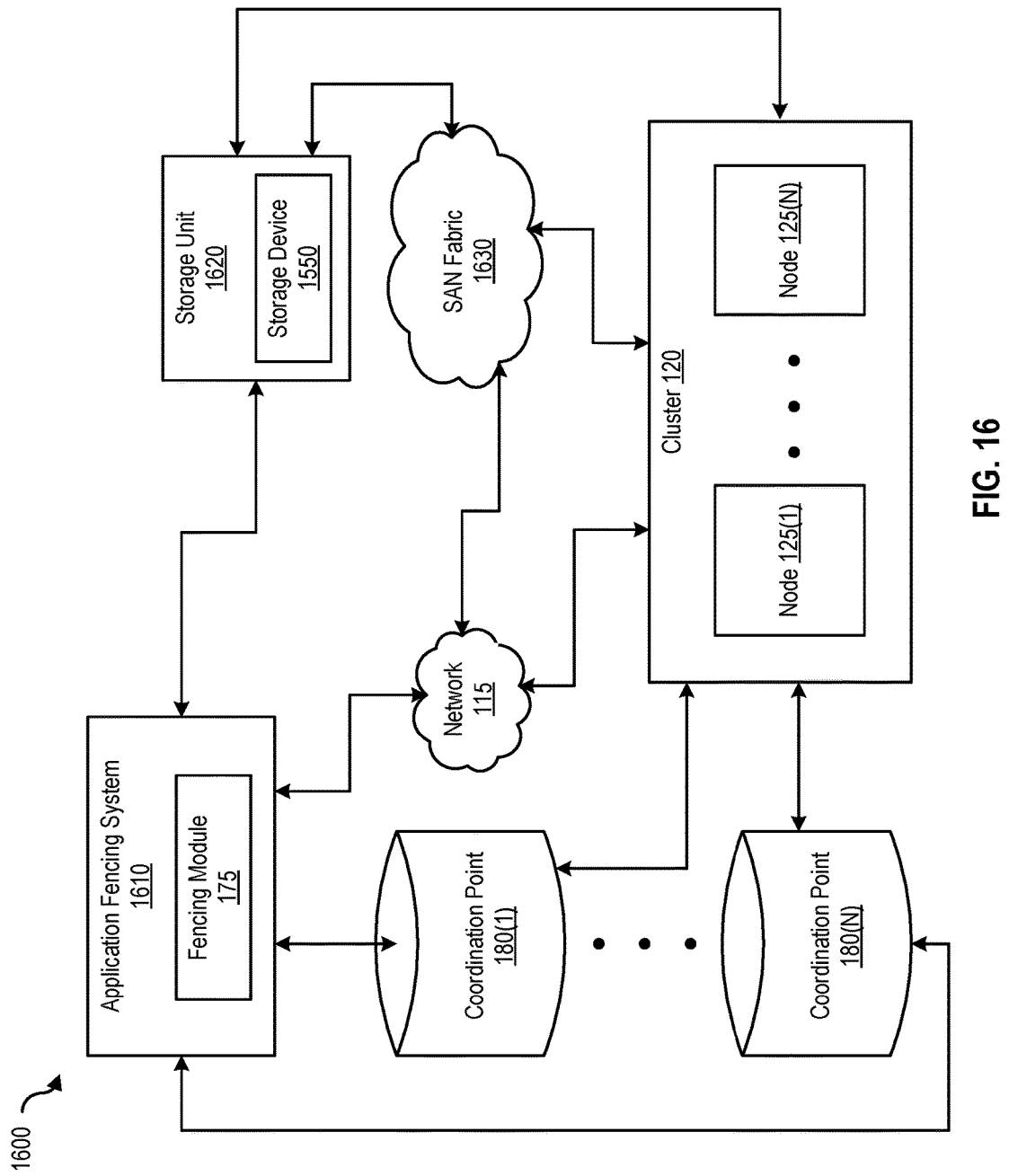
FIG. 16 is a block diagram of a networked system, illustrating how various computing devices can communicate via a network, according to one embodiment of the present disclosure.

FIG. 16 is a block diagram of a networked system, illustrating how various devices can communicate via a network, according to one embodiment. In certain embodiments, network-attached storage (NAS) devices may be configured to communicate with nodes 125(1)-(N) in cluster 120, and/or coordination points 180(1)-(N) using various protocols, such as Network File System (NFS), Server Message Block (SMB), or Common Internet File System (CIFS). Network 115 generally represents any type or form of computer network or architecture capable of facilitating communication between nodes 125(1)-(N) in cluster 120, coordination points 180(1)-(N), and data disks 195(1)-(N). In certain embodiments, a communication interface, such as communication interface 1545 in FIG. 15, may be used to provide connectivity between nodes 125(1)-(N) in cluster 120, coordination points 180(1)-(N), data disks 195(1)-(N), and network 115. It should be noted that the embodiments described and/or illustrated herein are not limited to the Internet or any particular network-based environment. For example, network 115 can be a Storage Area Network (SAN).

In one embodiment, all or a portion of one or more of the disclosed embodiments may be encoded as a computer program and loaded onto and executed by nodes 125(1)-(N) and/or coordination points 180(1)-(N). All or a portion of one or more of the embodiments disclosed herein may also be encoded as a computer program, stored on nodes 125(1)-(N) and/or coordination points 180(1)-(N), and distributed over network 115. In some examples, all or a portion of nodes 125(1)-(N), cluster 120, and/or coordination points 180(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, fencing module 175 may transform the behavior of nodes 125(1)-(N) in order to cause nodes 125(1)-(N) to perform application-aware I/O fencing operations.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   determining a first weight assigned to a first application instance of a plurality of application instances and a second weight assigned to a second application instance of the plurality of application instances, wherein
      each of the plurality of application instances is an instance of an application,
      the first application instance is executed by a first node of a cluster of nodes, and
      the second application instance is executed by a second node of the cluster of nodes; and
   in response to detection of a network partition event, performing an application fencing operation, wherein
      the network partition event results in partitioning of the cluster of nodes into at least a first sub-cluster and a second sub-cluster,
      the first node is comprised in the first sub-cluster,
      the second node is comprised in the second sub-cluster, and
      the application fencing operation comprises
         terminating one of the first application instance or the second application instance, wherein
            the terminating is based, at least in part, on the first weight and the second weight, and
            the terminating is performed without terminating either of the first node or the second node.

2. The computer-implemented method of claim 1, further comprising:
   installing each identifier of a plurality of identifiers on one or more coordination points, wherein
      the each identifier of the plurality of identifiers associates a corresponding application instance of the plurality of application instances with a corresponding node of the cluster of nodes.

3. The computer-implemented method of claim 2, further comprising:
   accessing an application weight matrix, wherein
      the application weight matrix comprises the first weight and the second weight.

4. The computer-implemented method of claim 3, further comprising:
   receiving the application weight matrix;
   generating the plurality of identifiers, wherein
      each of the plurality of identifiers is one of a plurality of registration keys; and
   as part of the installing, storing the plurality of registration keys on the one or more coordination points.

5. The computer-implemented method of claim 4, wherein
   each of the one or more coordination points comprises at least one of
      a coordinator disk, or
      a coordination point server.

6. The computer-implemented method of claim 3, further comprising:
   performing a partition arbitration process using the application weight matrix.

7. The computer-implemented method of claim 6, wherein
   the network partition event partitions the cluster of nodes into a plurality of sub-clusters,
   the plurality of sub-clusters comprises the first sub-cluster and the second sub-cluster, and
   the performing the partition arbitration process comprises determining a winner sub-cluster of the plurality of sub-clusters and one or more loser sub-clusters of the plurality of sub-clusters by performing a fencing race.

8. The computer-implemented method of claim 7, further comprising:
   excluding a third application instance of a plurality of other application instances and a fourth application instance of the plurality of other application instances from the fencing race, if both the third application instance and the fourth application instance are executed on one or more nodes of the cluster of nodes and the one or more nodes are within one sub-cluster of the plurality of sub-clusters, wherein
      each of the plurality of other application instances is an instance of an other application; and
   including the third application instance and the fourth application instance in the fencing race, if the third application instance is executed by a third node of the cluster of nodes, the fourth application instance is executed by a fourth node of the cluster of nodes, and the third node and the fourth node belong to different ones of the plurality of sub-clusters.

9. The computer-implemented method of claim 7, wherein
   the fencing race is decided based, at least in part, on information in the application weight matrix.

10. The computer-implemented method of claim 2, further comprising:
    as part of the installing, storing each of a plurality of registration keys on the one or more coordination points, wherein
       the each identifier of the plurality of identifiers is one of the plurality of registration keys; and
    performing a partition arbitration process that comprises performing a fencing race, wherein
       as part of the fencing race, a registration key of the plurality of registration keys for one of the first application instance or the second application instance is uninstalled from a coordination point of the one or more coordination points based, at least in part, on the first weight and the second weight.

11. A non-transitory computer-readable storage medium storing program instructions executable to cause one or more processors to:
    determine a first weight assigned to a first application instance of a plurality of application instances and a second weight assigned to a second application instance of the plurality of application instances, wherein
       each of the plurality of application instances is an instance of an application, the first application instance is executed by a first node of a cluster of nodes, and the second application instance is executed by a second node of the cluster of nodes; and in response to detection of a network partition event, perform an application fencing operation, wherein the network partition event results in partitioning of the cluster of nodes into at least a first sub-cluster and a second sub-cluster, the first node is comprised in the first sub-cluster, and the second node is comprised in the second sub-cluster, and the application fencing operation comprises terminating one of the first application instance or the second application instance, wherein the terminating is based, at least in part, on the first weight and the second weight, and the terminating is performed without terminating either of the first node or the second node.

12. The non-transitory computer-readable storage medium of claim 11, wherein the program instructions are further executable to cause the one or more processors to:

install each identifier of a plurality of identifiers on one or more coordination points, wherein the each identifier of the plurality of identifiers associates a corresponding application instance of the plurality of application instances with a corresponding node of the cluster of nodes.

13. The non-transitory computer-readable storage medium of claim 12, wherein the program instructions are further executable to cause the one or more processors to:

access an application weight matrix, wherein the application weight matrix comprises the first weight and the second weight;

receive the application weight matrix;

generate the plurality of identifiers, wherein each of the plurality of identifiers is one of a plurality of registration keys; and store the plurality of registration keys on the one or more coordination points.

14. The non-transitory computer-readable storage medium of claim 13, wherein each of the one or more coordination points comprises at least one of a coordinator disk, or a coordination point server.

15. The non-transitory computer-readable storage medium of claim 13, wherein the program instructions are further executable to cause the one or more processors to:

perform a partition arbitration process using the application weight matrix, wherein the partition arbitration process comprises determining a winner sub-cluster of the plurality of sub-clusters and one or more loser sub-clusters of the plurality of sub-clusters by performing a fencing race, wherein the fencing race is decided based, at least in part, on information in the application weight matrix, and as part of the fencing race, a registration key of the plurality of registration keys for one of the first application instance or the second application instance is uninstalled from a coordination point of the one or more coordination points based, at least in part, on the first weight and the second weight.

16. A system comprising:

one or more processors; and a computer-readable storage medium coupled to the one or more processors, wherein the computer-readable storage medium stores program instructions executable by the one or more processors to perform a method comprising determining a first weight assigned to a first application instance of a plurality of application instances and a second weight assigned to a second application instance of the plurality of application instances, wherein each of the plurality of application instances is an instance of an application, the first application instance is executed by a first node of a cluster of nodes, and the second application instance is executed by a second node of the cluster of nodes, and in response to detection of a network partition event, performing an application fencing operation, wherein the network partition event results in partitioning of the cluster of nodes into at least a first sub-cluster and a second sub-cluster, the first node is comprised in the first sub-cluster, the second node is comprised in the second sub-cluster, and the application fencing operation comprises terminating one of the first application instance or the second application instance, wherein the terminating is based, at least in part, on the first weight and the second weight, and the terminating is performed without terminating either of the first node or the second node.

17. The system of claim 16, wherein the method further comprises:

installing each identifier of a plurality of identifiers on one or more coordination points, wherein the each identifier of the plurality of identifiers associates a corresponding application instance of the plurality of application instances with a corresponding node of the cluster of nodes.

18. The system of claim 17, wherein the method further comprises:

accessing an application weight matrix, wherein the application weight matrix comprises the first weight and the second weight;

receiving the application weight matrix;

generating the plurality of identifiers, wherein each of the plurality of identifiers is one of a plurality of registration keys; and as part of the installing, storing the plurality of registration keys on the one or more coordination points.

19. The system of claim 18, wherein each of the one or more coordination points comprises at least one of a coordinator disk, or a coordination point server.

20. The system of claim 18, wherein the method further comprises:

performing a partition arbitration process using the application weight matrix.

21. The system of claim 20, wherein the network partition event partitions the cluster of nodes into a plurality of sub-clusters, the plurality of sub-clusters comprises the first sub-cluster and the second sub-cluster, and the performing the partition arbitration process comprises determining a winner sub-cluster of the plurality of sub-clusters and one or more loser sub-clusters of the plurality of sub-clusters by performing a fencing race, wherein
the fencing race is decided based, at least in part, on information in the application weight matrix, and
as part of the fencing race, a registration key of the plurality of registration keys for one of the first application instance or the second application instance is uninstalled from a coordination point of the one or more coordination points based, at least in part, on the first weight and the second weight.

22. The system of claim 21, wherein the method further comprises:
excluding a third application instance of a plurality of other application instances and a fourth application instance of the plurality of other application instances from the fencing race, if both the third application instance and the fourth application instance are executed on one or more nodes of the cluster of nodes and the one or more nodes are within one sub-cluster of the plurality of sub-clusters, wherein
each of the plurality of other application instances is an instance of an other application; and
including the third application instance and the fourth application instance in the fencing race, if the third application instance is executed by a third node of the cluster of nodes, the fourth application instance is executed by a fourth node of the cluster of nodes, and the third node and the fourth node belong to different ones of the plurality of sub-clusters.

* * * * *